G. D. GRIFFITHS.
GRAIN SHOCKER.
APPLICATION FILED OCT. 5, 1911.
1,046,461.
Patented Dec. 10, 1912.
8 SHEETS—SHEET 2.
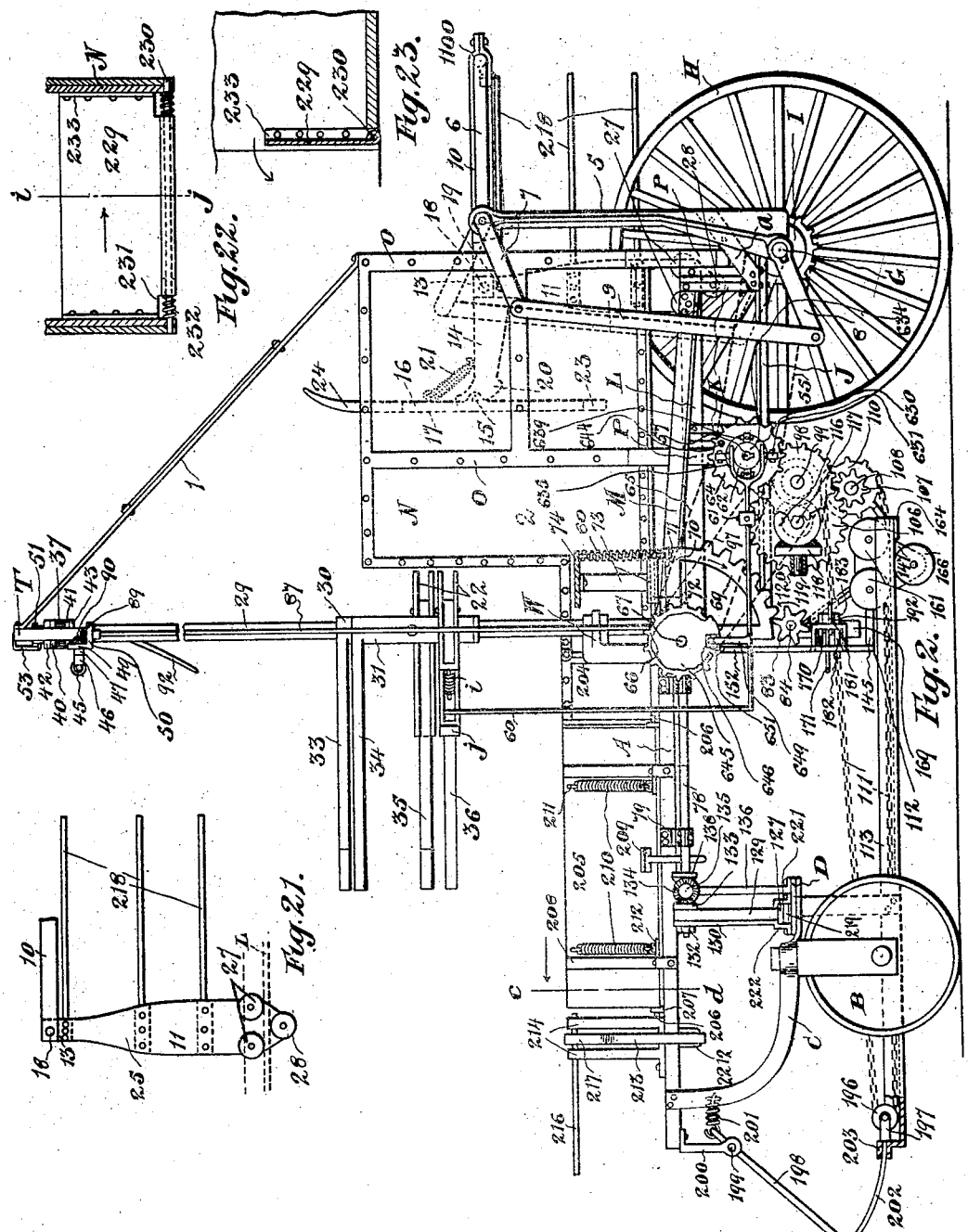
Witnesses.
S. C. J. Thacker
E. Baird
Inventor:
Guy D. Griffiths
by Egerton R. Case
atty

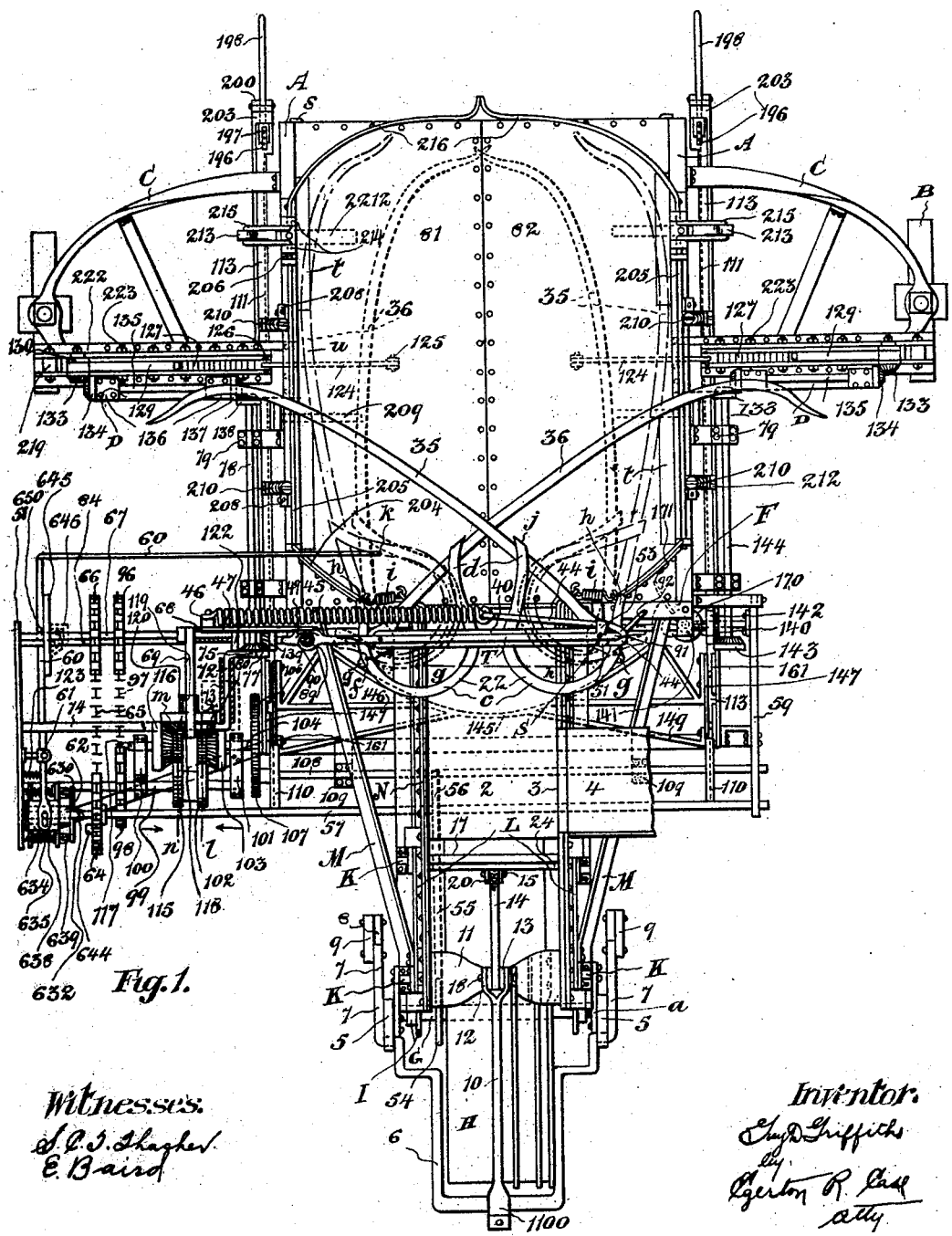

G. D. GRIFFITHS.
GRAIN SHOCKER.
APPLICATION FILED OCT. 5, 1911.

1,046,461.

Patented Dec. 10, 1912.
8 SHEETS—SHEET 3.

Witnesses.

Inventor.

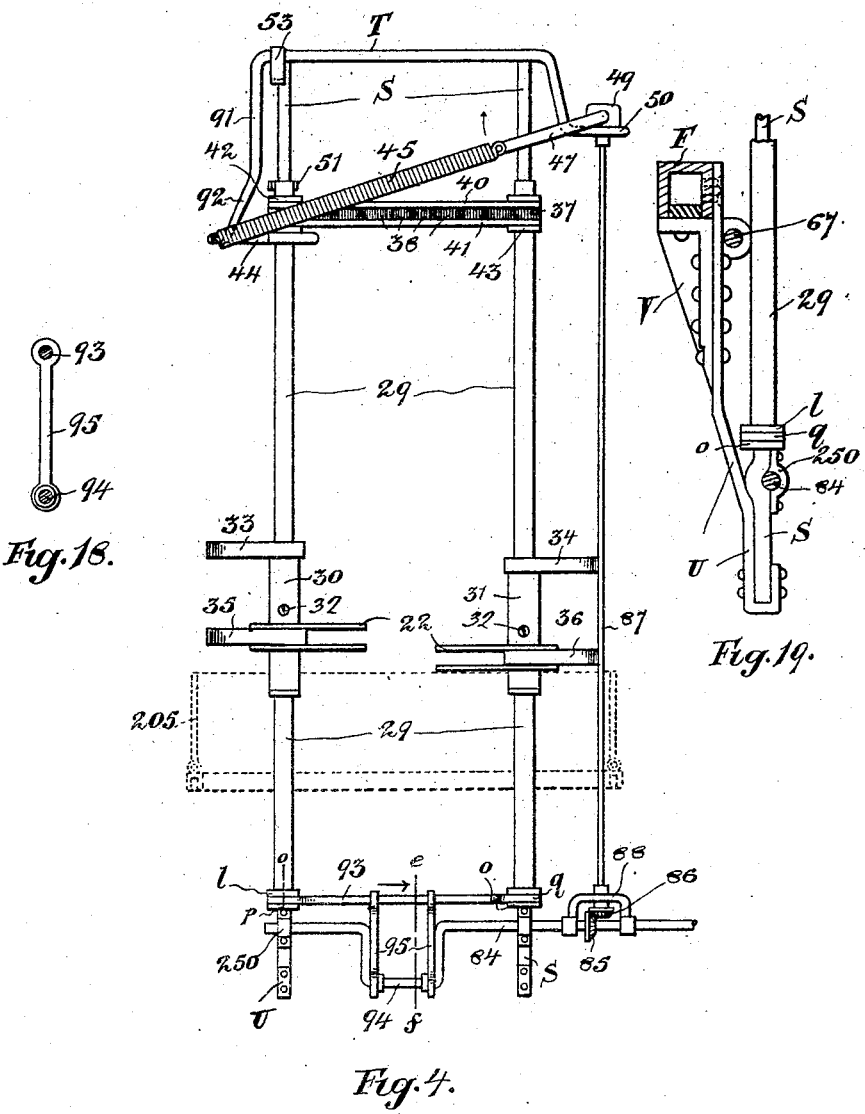

G. D. GRIFFITHS.
GRAIN SHOCKER.
APPLICATION FILED OCT. 5, 1911.
1,046,461.
Patented Dec. 10, 1912.
8 SHEETS—SHEET 5.
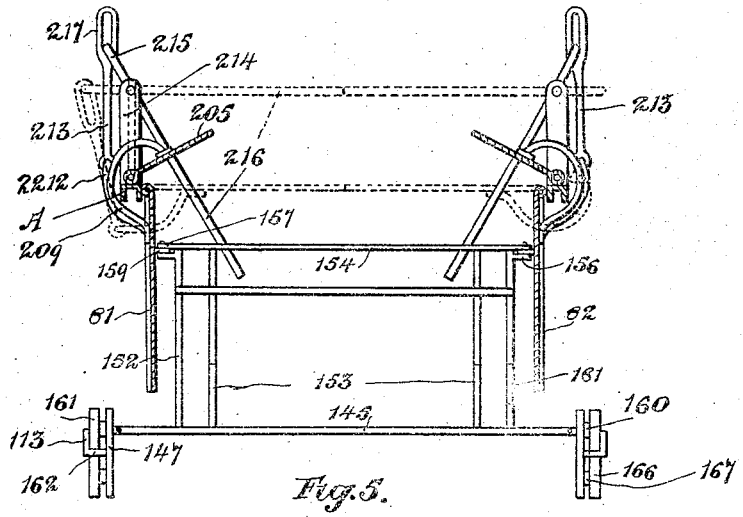
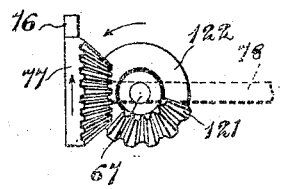
Fig. 24.
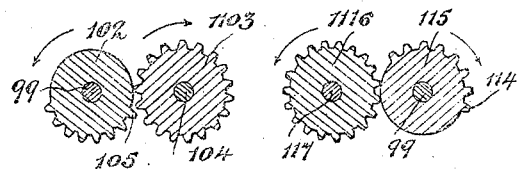
Fig. 25. Fig. 26.
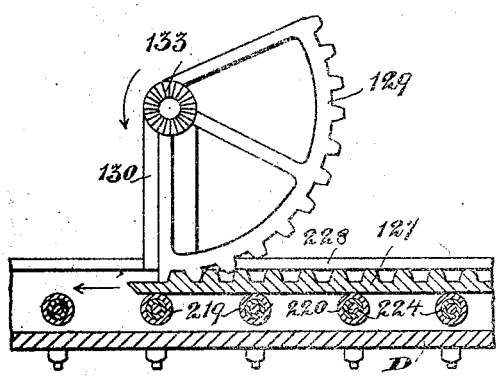
Fig. 6.
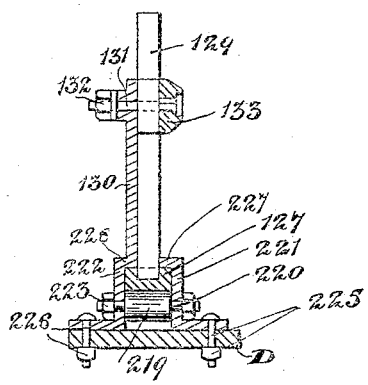
Fig. 7.

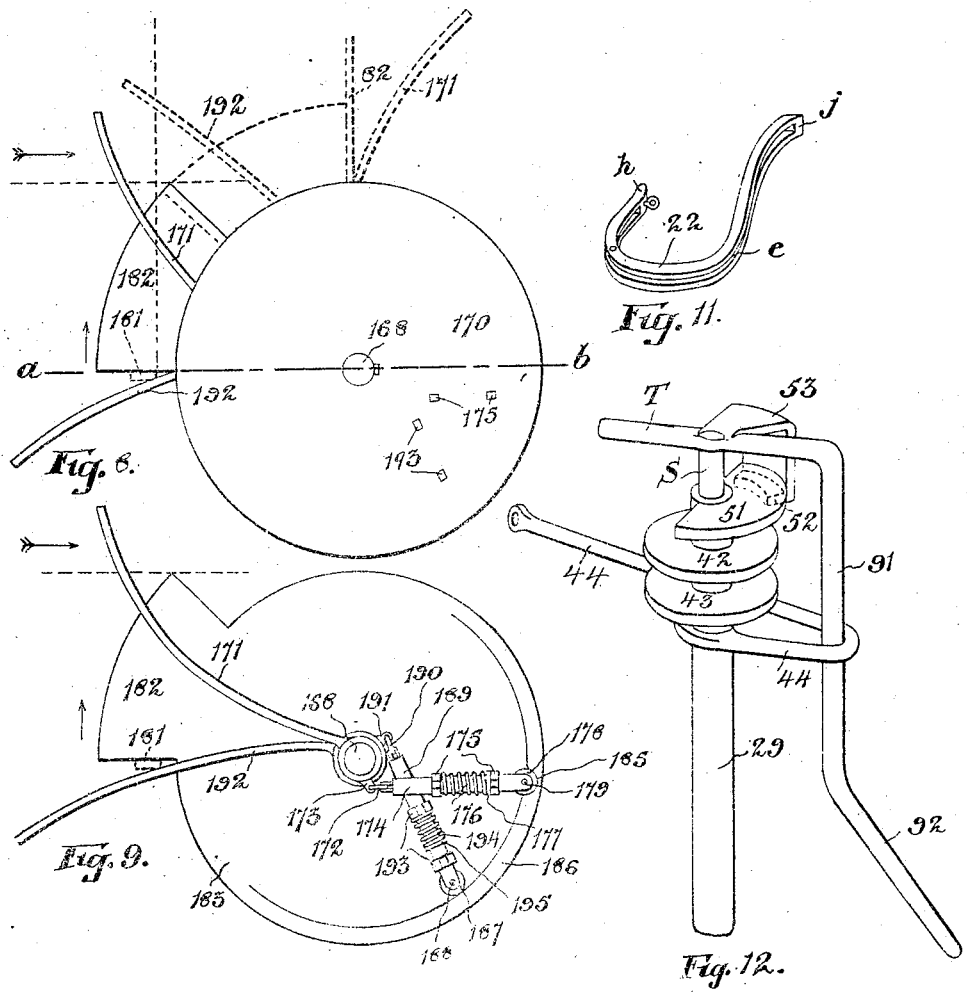

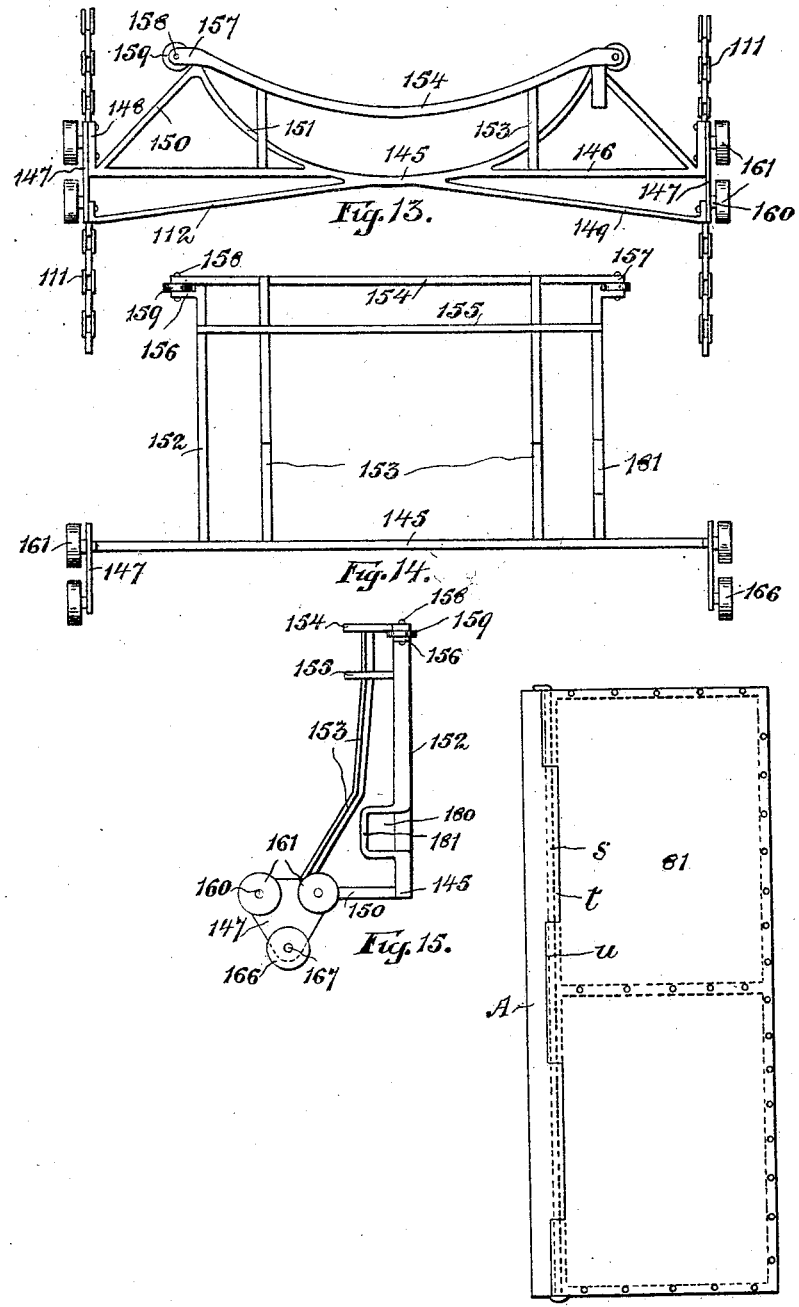

G. D. GRIFFITHS.
GRAIN SHOCKER.
APPLICATION FILED OCT. 5, 1911.

1,046,461.

Patented Dec. 10, 1912.

8 SHEETS—SHEET 8.

Witnesses.

Inventor.

UNITED STATES PATENT OFFICE.

GUY DESMOND GRIFFITHS, OF ACME, ALBERTA, CANADA.

GRAIN-SHOCKER.

1,046,461. Specification of Letters Patent. Patented Dec 10, 1912.

Application filed October 5, 1911. Serial No. 653,020.

*To all whom it may concern:*

Be it known that I, GUY DESMOND GRIFFITHS, a subject of the King of Great Britain, residing at the town of Acme, in the Province of Alberta, Canada, farmer, have invented certain new and useful Improvements in Grain-Shockers, of which the following is a specification.

My invention relates to improvements in grain shockers, and the principal object of my invention is to design an agricultural implement which will shock the grain as the binder cuts it, and deposit it on the ground in shock form, thus doing away with manual labor now required for this purpose.

Further objects of my invention will appear in the following specification.

My machine or implement, is composed of a combination of three groups of automatic elements carried for convenience sake, by a common frame, and in the order of the functions performed, these groups consist of (1) means for building the shock as each sheaf is received from the binder, automatic means being provided which will yield according to the increase in the size of the shock, and support each sheaf of the shock in vertical position; (2) means for depositing the sheaves composing the shock, butt downward on the ground; and (3) means whereby the sheaves composing the shock are kept from becoming entangled with the machine so soon as the machine has dropped the shock, as hereinafter more particularly explained.

Figure 20:
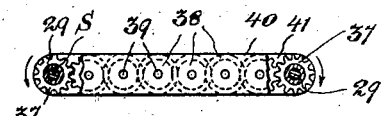
Figure 27:
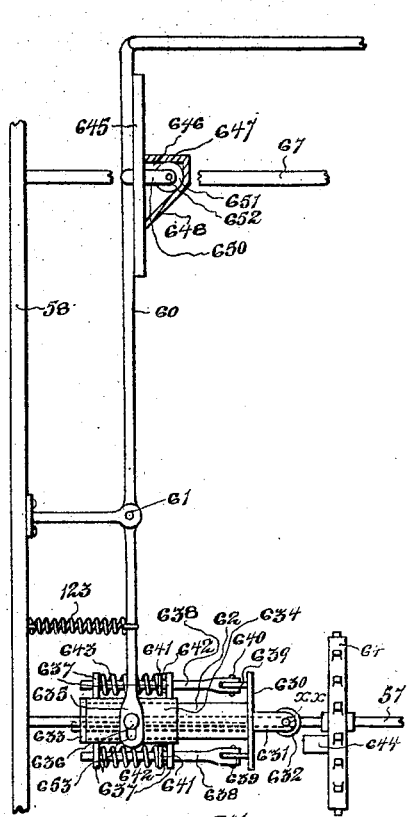
Figure 28:
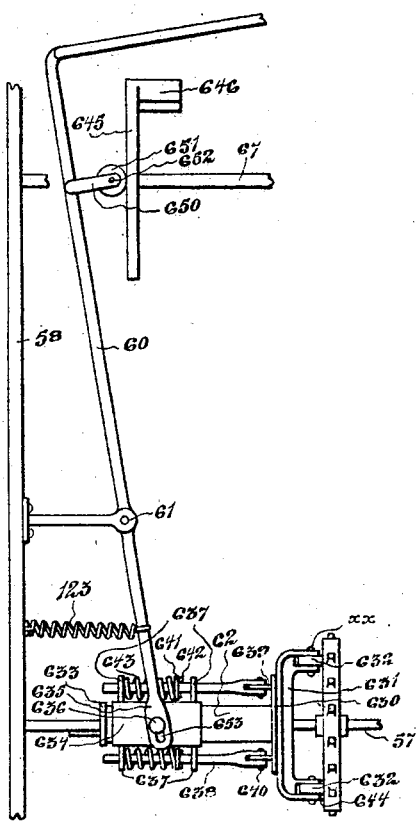
Figure 29:
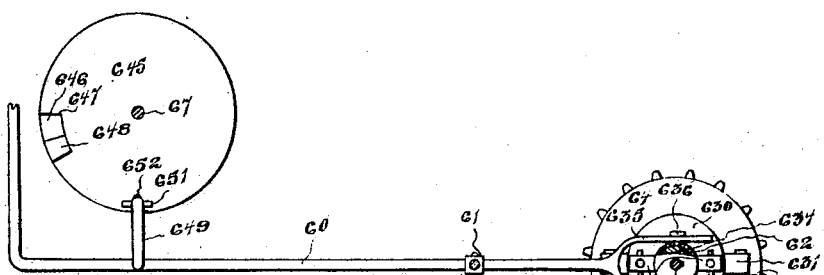

Figure 1 is a plan view of my machine; Fig. 2 is a side elevation thereof, certain supporting parts being omitted for clearness of illustration, and Fig. 3 a front elevation thereof. Fig. 4 is an end elevation, looking from the rear, showing the position of the supporting means for the sheaves when the shock is dumped. Fig. 5 is a vertical cross section on the line c—d, Fig. 2, showing the means whereby the trap doors of the shock-chamber are ultimately opened and closed. This figure also shows the "follower" in position between the said trap-doors after they have been opened. Fig. 6 is a longitudinal central section through the racks, and a side elevation of the quadrant co-acting therewith, whereby the trap-doors of the shock chamber are closed, Fig. 7 is a vertical cross section through one of the racks and supporting parts therefor, illustrated in Fig. 6, showing how the quadrants have bearing. Fig. 8 is a plan view of the locking and unlocking mechanism for the "follower". Fig. 9 is a plan view of the mechanism illustrated in Fig. 8 with the top cover removed. Fig. 10 is a vertical central cross section on the line a—b, Fig. 8, through the base of said locking and unlocking mechanism, showing internal construction. Fig. 11 is a perspective view of one of the auxiliary arms carried by the supporting arms operating in the shock-chamber. Fig. 12 is a perspective view, on an enlarged scale, of the means, whereby the supporting arms, and their connected parts, are locked against vertical movement at certain times. Figs. 13, 14 and 15 are, respectively, a plan view; a rear elevation and a side elevation, of the follower. Fig. 16 is a plan view of one of the trap-doors of the shock-chamber showing how the same is swung in its place. Fig. 17 is a vertical central section on the line o—p Fig. 4. Fig. 18 is a vertical cross section on the line e—f, Fig. 4. Fig. 19 is a detail, partly in cross section, showing a side elevation of the lower part of one of the supports for the tubular shafts carrying the supporting arms operating in the shock-chamber. Fig. 20 is a plan view of the train of gearing, parts being broken away, and parts being shown in section, whereby the supporting arms are given the proper movements. Fig. 21 is a side elevation of portion of the plunger carriage showing a cut-off whereby sheaves are prevented from passing into the sheaf chamber at certain times. Fig. 22 is a vertical section on the line g—h, Fig. 1. Fig. 23 is a vertical cross section on the line i—j, Fig. 22. Fig. 24 is a detail view of certain gearing, in normal position, whereby the quadrants or racks connected with the trap-doors open and close these doors at certain times. Fig. 25 is a vertical cross section on the line k—l, Fig. 1, and Fig. 26 is a vertical cross section on the line m—n, Fig. 1. Fig. 27 is a plan view of the clutch showing the same out of engagement with its associated sprocket wheel. This figure also shows a plan view of means, partly in section, whereby the clutch is held in engagement with its associated sprocket wheel at certain times. Fig. 28 is a view similar to Fig. 27, except that the clutch is shown in engagement with its associated sprocket wheel, and Fig. 29 is a side elevation of the parts illustrated in Fig. 28, with certain parts removed.

In the drawings, like characters of reference indicate corresponding parts in each figure.

By any suitable means, each sheaf is conveyed from the binder into the sheaf-chamber, and it is then fed by a plunger into the shock-chamber, and during its passage into said shock-chamber, it is passed between a pair of spring-controlled auxiliary arms carried by the lower pair of supporting arms. There is also an upper pair of supporting arms carried by the same means carrying said lower pair of supporting arms; these supporting arms are also spring-controlled, and as the shock increases in size, the supporting arms yield until ultimately they occupy the position shown in short dotted lines in Fig. 1, which position indicates that the shock is formed. So soon as a shock is formed, one of the said supporting arms contacts with lever mechanism which permits energy to be transmitted from a driven shaft so as to release certain mechanism which results in the unlocking of the supporting means for the trap-doors of the shock-chamber, when, immediately, these doors drop down thus permitting the shock to be deposited on the ground. Simultaneous with the drop of the shock, the said supporting arms and auxiliary arms are dropped down into the position shown in Fig. 4 so as to support the sides of the shock so that it may be deposited in good shape on the ground. So soon as the shock is dropped, a train of gearing is put into motion, whereby the follower is run along a track underneath the shock-chamber and between the depending doors thereof, and as this follower presses against the shock, it keeps the same from becoming entangled with the machine. Immediately the follower has reached the limit of its out movement, it is returned to normal position, and then means are operated to close the trap-doors of the shock chamber.

The plunger is reciprocating as long as the implement is in motion, and as before set forth, said supporting arms; the trap-doors, and the follower, are only brought into operation to release and tend the shock when the same has been formed, and dumped. At the outset, it is to be understood that the follower is locked in normal position by the mechanism, illustrated in Figs. 8 to 10, and that when the trap-doors are open, the mechanism illustrated in Figs. 8 to 10 is operated to unlock the follower.

Figure 3:
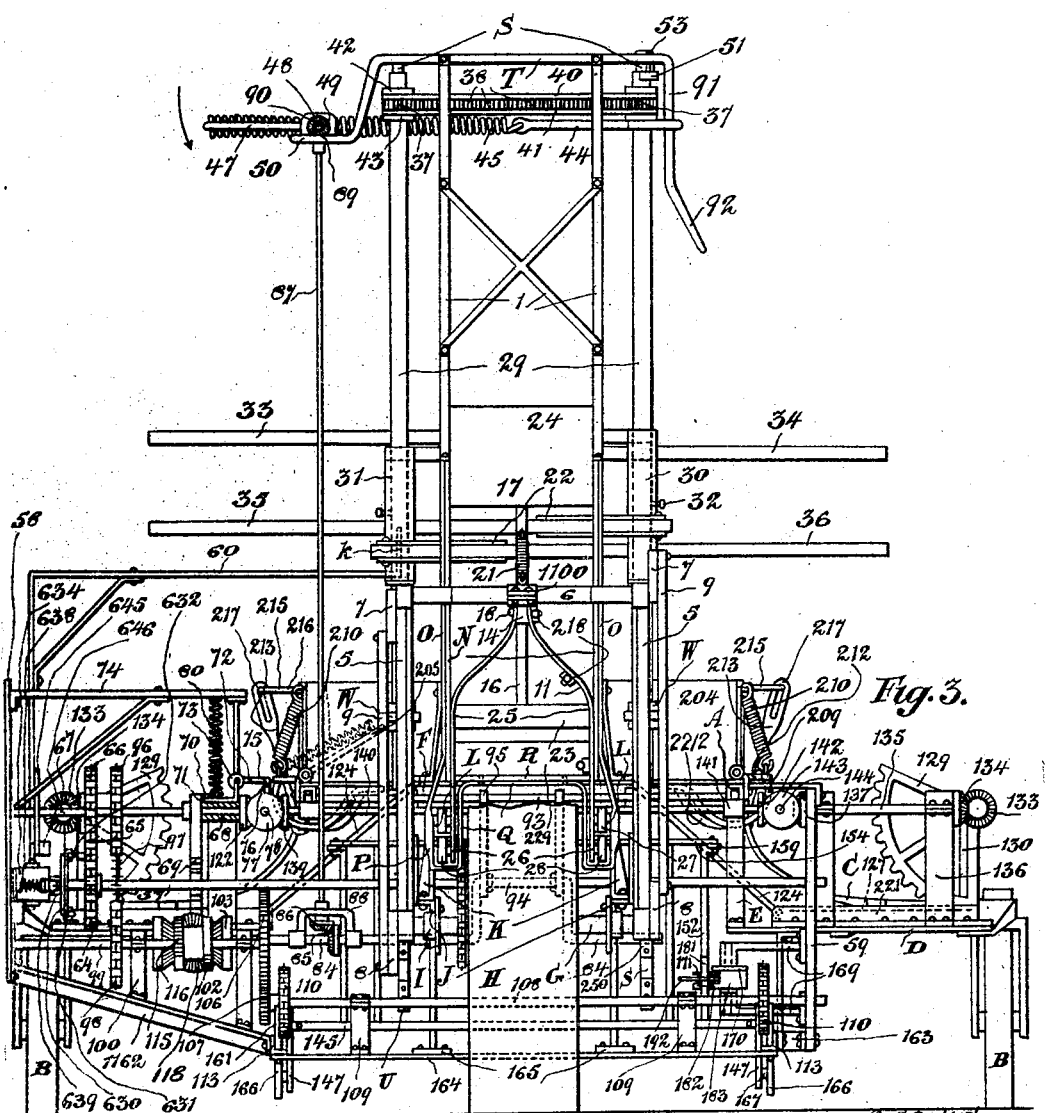

The supporting arms are controlled by a spring and connected mechanism so that they will always exert a certain amount of pressure against the sheaves of the shock. As the supporting arms are dropping downward simultaneous with the deposit of the shock on the ground, they are forced wide open so that the sheaves of the shock will not catch thereagainst; this position of the arms is illustrated in long-and-short dotted lines in Fig. 1 and in full lines in Fig. 4. It is to be understood that the strength of the spring co-acting with said arms is at its minimum when the parts occupy the position illustrated in Fig. 4. The spring co-acting with the said arms is under low tension when the parts are in the position illustrated in full lines in Figs. 1, 2 and 3, and when the supporting arms occupy the position shown in short dotted lines in Fig. 1, the said spring is exerting its maximum tension against the said arms. For the purpose of clearness in illustration, the upper pair of supporting arms, shown clearly in Figs. 2, 3 and 4, are omitted in Fig. 1.

Supported at the end of the shock-chamber are a pair of butt-rods which compress the butts of the sheaves resting thereagainst sufficient so as to retain them on the trap-doors. Simultaneously with the release of said trap-doors, the side wings of the shock-chamber, and the said butt-rods, are moved into the position illustrated in Fig. 5, so as to facilitate the dumping of the shock.

The auxiliary arms, co-acting with the lower pair of supporting arms, yield as a sheaf is pushed therebetween by means of the plunger, and after the passage of the sheaf therebetween, they automatically close so as to prevent the sheaf from falling out of the shock-chamber. These auxiliary arms are so positioned that the plunger can freely pass therebetween without conflicting therewith. Positioned at the discharge end of the sheaf-chamber is a spring-controlled plate, vertically disposed, which yields so as to allow for the passage of the sheaves under the influence of the plunger, and when the sheaf has been passed into the shock chamber this plate flies back into position and so retains the butt of the sheaf within the shock-chamber.

The implement or machine is designed to be used as an attachment to a binder, but for the purpose of illustration it is not considered necessary to show the machine attached to a binder.

The frame may be composed of side members A, suitably braced together.

B are the supporting-wheels for the rear end of the machine, and the same are swiveled after any suitable construction in the brackets C which are suitably secured to the side members A. These brackets C are also secured to the bottom plates D of the side racks, which bottom plates are suitably supported from the side members A by the uprights E (see Fig. 3).

F is a cross bar bracing the front ends of the side members A together.

G is the axle of the drive-wheel H, and same has bearing in the brackets I suitably secured to the side members J which are connected by the brackets K to the rails L with which co-act the carriage of the plunger. The said rails are secured by any suitable means, not shown, to the cross bar F.

M are side members secured to the rails L, and having their inner ends suitably secured to the cross bar F. These side members give lateral support to the said rails, and brace the members which support the axle G. The sheaf-chamber is composed of side walls N suitably braced.

O are strengthening ribs suitably secured to the side walls N, and having their lower portion P formed U-shaped extending vertically and horizontally as shown at Q so as to provide suitable supporting means for the floor R of the sheaf-chamber; this floor R is substantially on the same level as the trap-doors of the shock-chamber hereinafter referred to.

S are a pair of standards connected together at their upper ends by a cross bar T. The lower ends of these standards are each supported by a depending bracket U (see Figs. 3 and 19) which are secured to the cross-bar F by brackets V.

W are supporting posts suitably secured to the cross-bar F (see Figs. 2 and 3) down through which the standards S pass.

The cross bar T is connected by the brace-rods 1 with the frame or supporting means of the side walls N of the sheaf-chamber 2. The right-hand side of the sheaf-chamber 2 with reference to Fig. 1 is provided with an opening 3 through which each sheaf must pass before it can enter said sheaf-chamber.

4 is any suitable platform with which co-acts any suitable means (not herein illustrated because the construction and operation of the same is not material to a thorough knowledge of the present invention) whereby the sheaves are introduced, one at a time, into the sheaf-chamber 2.

5 are standards supported from the axle G, each secured by a brace $a$ with its associated one of the outermost pair of the brackets K. Having bearing in the ends of the standards 5 is a crank 6 provided with crank-arms 7 which operate on the outer side of said standards 5.

8 are a pair of crank-arms keyed to the axle G and one at each end thereof and positioned outside of the standards 5; these crank-arms describe an arc of the same size as the crank-arms 7, and each pair of crank-arms 7 and 8 are connected together by a link-rod 9. Upon referring to Figs. 1 and 2, particularly Fig. 2, it will be noticed that the pairs of crank arms 7 and 8 are so positioned as to prevent any dead centering of the connecting-rod 10 mounted at 1100 on the crank 6. The inner end of the connecting-rod 10 is pivoted or hinged to the plunger-carriage 11, by any suitable means: according to the construction illustrated, the inner end 12 of said connecting-rod is forked and straddles the head 13 of said plunger carriage. Positioned in the head of said plunger carriage, and between the portions in the forked end 12 of said connecting-rod, is an arm 14 which is pivoted at 15 to the vertical bar 16 of the plunger 17.

18 is a bolt passing through the forked end 12 and the arm 14, and through the head 13 whereby all these parts are connected together, and the said connecting-rod 10 hinged or pivoted to said plunger-carriage 11.

19 is a bolt or equivalent means, passing through the head 13 whereby the arm 14 is firmly held in place. The head 20 of the arm 14 is curved as shown, and this arm is connected by a spring 21 with the plunger 17. In the position of the parts illustrated in Figs. 1 and 2, the plunger 17 occupies a vertical position. Each time the plunger is brought in contact with a sheaf, it can have the necessary movement on its pivot 15. This movement is particularly desirable when the shock is nearing completion. It is of course evident to one skilled in this art that each time a fresh sheaf is introduced into the shock-chamber, this act will cause the sheaves contained therein to be moved by the plunger 17 to allow for the entry thereinto of the new sheaf, and in order to distribute the pushing force of said plunger to the best advantage, it is mounted on the arm 14 as before described.

The vertical bar 16 is somewhat narrower than the width between the auxiliary arms 22 (see Fig. 1) so as to allow these auxiliary arms to close after the sheaf has been passed therebetween, and so prevent any possibility of the sheaf falling back into the sheaf-chamber. The plunger 17 is provided with a foot 23 and the head 24, which is preferably curved outward as shown so as to enable me to obtain the most advantageous results in handling the sheaves. The foot 23 of course comes in contact with the butt of the sheaf, and operates a suitable distance above the floor R of the sheaf-chamber 2. By reason of the crank 6 and connecting-rod 10, and the parts before described, as the implement advances, the plunger 17 is reciprocated back and forth, and each time it moves to the limit of its in-movement, it pushes a sheaf into the shock-chamber.

The plunger carriage 11 is composed of two vertical members 25 which are curved together to form the head 13; and these members rest with their lower ends 26 operating between the U-shaped lower portions P of the ribs O and between the rails L. Each lower end is provided with three wheels journaled therein, a pair of upper wheels 27 which operate upon the rails L and a lower wheel 28 which operates against the under side of the said rails. These wheels are so positioned as to provide the free and even reciprocating movement of the plunger carriage 11.

Mounted to have axial and longitudinal movement on each of the standards S is a tubular shaft 29.

30 and 31 are sleeves secured by the set screws 32 to the tubular-shafts 29. Integrally formed respectively with these sleeves, or secured thereto, is an upper pair of supporting arms 33 and 34. Keyed respectively to the sleeves 30 and 31 are supporting arms 35 and 36 which compose the lower pair of supporting arms. Each of the tubular shafts 29 carries a toothed-pinion 37 keyed thereto. A train of gearing is interposed between the toothed-pinions 37, and is composed of a plurality of toothed pinions 38 the same size as the toothed pinions 37, and these are journaled by their shafts 39 in the plates 40 and 41 through which the said tubular shafts 29 pass. Each tubular shaft is provided with a pair of collars 42 and 43 which are keyed thereto, and which hold the said plates 40 and 41 in position. Upon referring particularly to Fig. 1, it will be understood that the supporting-arms must move around their tubular shafts at the same rate of movement and in opposite directions, and therefore the train of gearing illustrated in Fig. 20 particularly must be provided. The said supporting arms must move inward or outward, and always in opposite directions. As the shock-chamber is being filled with sheaves, the entry of each additional sheaf will cause the supporting-arms 33, 34, 35 and 36 to be moved a sufficient distance apart, and at the same speed. Keyed to one of the tubular shafts 29 is an arm 44, and to one end of this arm is secured a coiled-spring 45 the other end of which is secured to the outer end 46 (see Fig. 1) of the crank 47 which is keyed to the shaft 48 having bearing in the plate 49 carried by the bracket 50. The normal position of the parts just described, is illustrated in Figs. 1, 2, and 3 in full lines. As the arm 44 is moved by its tubular shaft 29 by reason of the before-described movements of the supporting arms, through the medium of the toothed pinions 37 and 38 before-described, the other tubular-shaft is turned and gives the required movement to the supporting arms 34 and 36 carried thereby. The described movements of said supporting arms continues until the shock is formed when the said arms occupy the position illustrated by short dotted lines in Fig. 1 when the shock is about to be dumped, as hereinafter more particularly explained.

Keyed to one of the tubular shafts 29 is a supporting flange 51 which, when these tubular shafts and their connected parts are in the position illustrated in Figs. 2, 3, and 12, is supported by the flange 52 of the bracket 53 carried by the cross bar T. This supporting flange is supported by the said bracket until the shock is about one-half formed, when said flange 51 has been moved clear of said bracket and so positioned as to permit the said supporting arms to drop into the position illustrated in Fig. 4. Means will be hereinafter particularly described whereby the said tubular shafts 29 and their connected parts, are held in their elevated position when the flange 51 has been moved out of engagement with the bracket 53, during the completion of the shock.

The supporting arms 35 and 36 are each provided with one of the auxiliary arms 22. The normal position of these auxiliary arms is illustrated in Fig. 1, and they are each provided with inward-curved portions $c$ which merge into outward shaped portions $d$. Each auxiliary arm is provided with a slot $e$ for the major portion of its length, and extending through the slot in each arm is the supporting arm associated with this arm. Each auxiliary arm is pivoted by a bolt or pin $f$ to the outer end $g$ of the supporting arm it is associated with, and the outer end $h$ of each auxiliary arm is connected by a spring $i$ with its associated supporting-arm. The springs $i$ exert force to keep the said auxiliary arms in the position illustrated in Fig. 1. The inner ends of each auxiliary arm is closed as shown at $j$ Fig. 11, so that the auxiliary arms will be limited in their in-movement by contacting each with its respective supporting arm. These said auxiliary arms yield as before described to allow for passage therebetween of the sheaves, and in due course are forced back into contact with their respective supporting arms so as to prevent the sheaves from passing back into the sheaf-chamber 2.

Keyed to the axle G is a sprocket-wheel 54 which is connected by a sprocket chain 55 with the sprocket-wheel 56 which is keyed on the shaft 57 journaled in suitable bearings 58 and 59 suitably supported by the frame of the machine. 60 is a clutch-rod which normally occupies the position illustrated in Figs. 1, 2 and 3. It will be noticed upon referring particularly to Fig. 1 that the upper end $k$ of this rod is in the path of movement of the supporting arm 36. Now when this supporting arm moves into the position shown by short dotted lines in Fig. 1, it contacts with the end $k$, thus forcing the clutch-rod 60 outward and around its pivot bearing 61 in which it is supported, and which bearing is carried by the bearing 58. The said bearing 61 is any suitable means which will permit the clutch rod 60 to describe an arc when moved.

62 is any suitable friction-clutch splined on the shaft 57. This friction clutch is integrally provided with a plate 630 and the bracket 631 in the ends of which are journaled the rollers 632 by the pins x x. The said clutch is provided at one end with a collar 633. This clutch rotates with the shaft 57, and mounted on said clutch is a sleeve 634. The forked end 635 of the rod 60 straddles the sleeve 634 and is pivoted thereto by the screws 636, as illustrated particularly in Fig. 29.

637 are lugs carried in pairs by each side of the sleeve 634 and mounted in each pair of these lugs is a rod 638 in the outer end of which is journaled a roller 639 by the pins 640. The rods 638 are preferably square in cross section where they operate through the said lugs and fit correspondingly-shaped holes so as to prevent axial movement of these rods in order that the rollers 639 may always properly co-act with the plate 630. Mounted on each of the said rods is a washer 641, and between these washers and their immediately-associated lugs 637 is an ordinary split pin or other suitable means 642. Mounted on each of the said rods and between the washers 641 and the pair of lugs to the left thereof is a coiled-spring 643. These springs keep the rollers 639 in contact with the plate 630.

64 is a sprocket wheel loosely mounted on the shaft 57, and this sprocket wheel is provided on its side adjacent the plate 630, with a pin or stud 644.

Keyed to the shaft 67 is a disk 645 provided with a pocket 646 provided with a horizontal wall 647 and an inward slanting wall 648.

649 is an arm provided with a horizontal extension 650 in the outer end of which is journaled a roller 651 by the pin 652. When the parts are in the position illustrated in Figs. 1, 2, 3, and 27, the roller 651 occupies the position illustrated in full lines in Fig. 27 within the pocket 646. When the clutch rod 60 is moved as described, the roller 651 is moved out of the pocket 646, and the friction clutch 62 is moved through the medium of the sleeve 634 and its connected parts, to position either of the rollers 632 so that as said friction clutch is rotated either one will come in contact with the pin or stud 644 and so rotate the sprocket wheel 64. The shaft 57 is always rotating when the machine is in use, and consequently when the friction clutch 62 is moved as described to lock the sprocket wheel 64 loosely journaled on the shaft 57, to said shaft, energy is conveyed by the sprocket chain 65 to the sprocket wheel 66 keyed to the shaft 67 journaled in the bearings 58 and 68. The movement of the shaft 67 of course moves the disk 645 keyed thereto, and so positions the pocket 646 in relation to the roller 651 as to prevent the roller occupying this pocket until the said shaft has made a complete revolution. The movement of this shaft moves the quadrant 69 keyed thereto in the direction indicated by arrow in Fig. 2. Now this quadrant is provided with a lug 70 which normally rests in contact with the heel 71 of the dog 72 which is journaled in the bearing 73 carried by the bracket 74 supported from the bearing 58. The toe 75 of said dog is normally in the path of movement of the lug 76 carried by the beveled-pinion 77 keyed to the shaft 78 held in suitable bearings 79 carried by the frame of the machine.

80 is a spring connecting the heel 71 of the dog 72 with the bracket 74, and normally keeping the toe 75 in the path of movement of the lug 76, and keeping the heel 71 against the lug 70. Now when the quadrant 69 commences to move as described, the dog 72 is operated so that its toe 75 will move out of the path of movement of the lug 76; and as the trap-doors 81 and 82 are held closed by this lug 76, when in contact with the toe 75, the said doors are, through the medium of certain mechanism, intermediate the beveled-pinion 77 and the said doors, unlocked, as a result of the described movements, and allowed to drop into the position illustrated in Fig. 5, and thus deposit the shock, butt downward, on the ground. As soon as the lug 76 is released as before described, since the bracket 53 is not supporting the flange 51, the tubular shafts 29 and the supporting arms carried thereby are lowered by means hereinafter described and ultimately occupy the position illustrated in Fig. 4, so as to follow the shock downward, for the purpose before set forth. Simultaneous with the movements just described, the toothed quadrant 69, designed to coact with the pinion 83 keyed to the shaft 84 (journaled in the bearing 58, and in the bearings 250 illustrated in Figs. 4 and 19, and carried by the standards S), moves this pinion and its shaft 84. Keyed to the shafts 84 is a beveled pinion 85 which is in mesh with the beveled pinion 86 keyed to the shaft 87. The lower end of this shaft 87 has bearing in the bracket 88 carried by the shaft 84.

89 is a beveled pinion keyed to the shaft 87, and operating above the bracket 50. The pinion 89 meshes with the beveled pinion 90 keyed to the shaft 48 which carries the crank 47. As a result of the co-action between the pinions just described, the crank 47 is moved in the direction indicated by arrow in Figs. 3 and 4 so that as the supporting-arms carried by the tubular shafts 29 are lowered, the spring 45 will be exerting its minimum tension against the said arms, for the purpose before set forth. Upon referring particularly to Fig. 12 it will be noticed that the arm 44 embraces the post 91 secured to or formed a part of the cross bar T. The major portion of this post rests in a position parallel to the standards S, and as the lower portion 92 of the post is downward, outward and backward as illustrated more particularly in Fig. 1, during the downward movement of the tubular shafts 29 by reason of the co-action between the arm 44 and the lower portion 92 of the post 91, the said arm 44 is moved into the position illustrated in Fig. 4 the same time the crank 47 occupies the position illustrated in this figure: as a result of the movements just described, and by reason of the co-action between the pinions 37 and the train of gearing therebetween, already described; the supporting arms 33, 34, 35, and 36 are moved into the position illustrated in long and short dotted lines in Fig. 1 and in full lines in Fig. 4.

94 is a crank formed in the shaft 84, and connecting this crank with the cross bar 93 are a pair of connecting-rods 95.

The parts just described are the means employed for lowering and raising the tubular shafts 29 and their connected parts, and from the foregoing part of this specification it will be clear that the said tubular shafts and their supporting arms are lowered as the shock is dumped on the ground. In due course, the said connecting rods and associated parts return the tubular shafts 29 and their supporting parts back to normal position, by reason of the continued rotation of the shaft 84, when the cam 52 supported by the bracket 53, and the supporting arms 33, 34, 35, and 36; crank 4.. and connected parts occupy the normal position illustrated in Figs. 1, 2 and 3.

Keyed to the shaft 67 is a sprocket wheel 96 which is connected by the sprocket chain 97 with the sprocket wheel 98 which is keyed on the shaft 99 mounted in the bearings 58, 100 and 101. Keyed to the shaft 99 is a spur-gear 102 which is only partially provided with teeth. This spur-gear 102 co-acts with a spur-gear 1103, carried by the beveled pinion 103 keyed to the shaft 104 journaled in the bearing 101. The normal position of the spur-gears 102 and 1103 is illustrated in Figs. 1 and 25. The tooth 105 of the spur-gear 102 is normally positioned so that it comes into mesh with the teeth of the spur-gear 1103 immediately the trap-doors 81 and 82 have been dropped and so the teeth of the spur-gear 102 will turn the spur-gear 1103 and so turn the beveled pinion 103 a certain distance. Now keyed to the shaft 104 is a gear-wheel 106 in mesh with the pinion 107 keyed to the shaft 108 mounted in the bearings 109 and 59, which are supported by the frame of the machine after any suitable manner. Keyed to the shaft 108 are two sprocket-wheels 110. With each of these sprocket-wheels co-act sprocket chains 111, each end of which are connected with their respective sides of the follower 112, as shown particularly in Fig. 13.

113 are rails on which the follower 112 operates.

As mentioned, when the shock is dumped, through the co-action of the spur-gears 102 and 1103 and beveled-pinion 103, and the gearing intermediate the same and the shaft 108, the follower 112 is run out on the said rails preferably at the same speed at which the machine advances, and so prevents any of the sheaves of the shock from becoming entangled with any of the parts of the machine. The length of the rails 113 will be such that the follower 112 can follow the shock far enough for the purpose before set forth. So soon as the follower 112 has reached the limit of its outward movement, the tooth 114 of the spur-gear 115 keyed to the shaft 99 comes into mesh with the spur-gear 1116 carried by the beveled pinion 116 keyed to the shaft 117 journaled in the bearing 100. The beveled pinion 116 is constantly in mesh with the beveled pinion 118 mounted by its shaft 119 in the bearing 120 suitably supported by the frame of the machine.

The beveled pinions 116, 118 and 103 are fully provided with teeth, and as the pinions 116 and 103 are constantly in mesh with the pinion 118, as a result of the co-action between the spur-gears 115 and 1116, and beveled-pinion 116 the follower 112 is returned to normal position and locked therein by the means hereinafter described. Immediately the follower 112 has returned to normal position, the tooth 121 of the beveled pinion 122 keyed to the shaft 67, comes into mesh with the beveled pinion 77 keyed to the shaft 78 and through the gearing hereinafter described, the trap-doors 81 and 82 are returned to normal position when they are locked by the toe 75 of the dog 72 resting in the path of movement of the lug 67 of the pinion 77.

123 is a spring connecting the clutch rod 60 with the bearing 58. So soon as the supporting arm 36 moves out of engagement with the clutch rod 60 the said pocket 646 will be positioned in the path of movement of the roller 651, and consequently the said spring 123 will force the clutch rod 60 into the position illustrated in Fig. 27. This movement of the clutch rod will bring the sleeve 634 in contact with the collar 633 and so will withdraw the clutch 62 and its connected parts until the rollers 632 are free to revolve without engaging the pin or stud 644, and consequently the train of gearing and other parts receiving movement from this sprocket wheel will come to rest. When the sleeve 634 is moved into the position illustrated in Fig. 28, the springs 643 are under increased compression and therefore they insure the snug engagement of the rollers 639 with the plate 630, and the roller 632 with the pin or stud 644. The face or side of the sprocket wheel 64 carrying the pin or stud 644 will be constructed so as to provide a flat surface for the rollers 632 to travel over.

The slanting wall 648 of the sprocket 646 permits the ready withdrawal and entry of the roller 651 in respect of said pocket without jarring.

Where the screws 636 pass through the forked end 635 of the clutch rod 60, are provided slots 653 to prevent binding.

The use of the spring-controlled rods 638 with the clutch 62 will prevent the rollers 632 from conflicting with the pin or stud 644 when the parts occupy the position illustrated in Fig. 27. These parts also prevent any undue strain coming on the clutch rod 60 when the same is operated by the arm 36, as any movement of said clutch rod beyond that necessary to clutch the wheel 64 to the shaft 57 will be absorbed by the springs 643. The disk 645 and the roller 651 co-acting therewith provide positive means whereby the shaft 67 is moved one revolution through power transmitted from the shaft 57.

I have now described the complete cycle of my machine, and shall, in the following part of this specification describe particularly the means for raising the trap-doors 81 and 82, and the means for unlocking the follower and locking the said trap-doors when they occupy the position illustrated in Fig. 5. Carried by each side of the machine are duplicate mechanisms for closing the trap-doors 81 and 82 and therefore the description of one of these mechanisms will do for both. When the dog 72 is moved out of contact with the pinion 77, this beveled pinion and the beveled pinion 122 occupy the position shown in Figs. 1 and 24 in respect of the position of their teeth. The pinion 77 is fully provided with teeth, whereas the pinion 122 is only partially provided with teeth: consequently as there is nothing to support the trap-doors 81 and 82, the weight thereof, together with the weight of the shock carried thereby, permits them to open and so permit the shock to fall.

124 is a rod hinged at 125 to the trap door 81 and hinged at 126 to the toothed rack 127 having bearing in the frame supported by the bottom plate D (see Figs. 2 and 3) carried by the bracket C.

129 is a toothed quadrant constantly in mesh with the rack 127. The toothed quadrant 129 is journaled in the standard 130 supported from the bottom plate D by the pin 131 passing therethrough and locked into position by the nut 132. Keyed on the pin 131 is a beveled pinion 133 which is constantly in mesh with a beveled pinion 134 keyed to the shaft 135 held in bearings 136 supported on the bottom plate D. 137 is a beveled pinion which is constantly in mesh with a beveled pinion 138 keyed to the shaft 78. When the trap-doors drop open, through their rods connecting the same with their racks 127, these racks are moved outward in the direction indicated by arrow in Fig. 6, thus moving the quadrant 129 and allowing the necessary movement for the gearing connected therewith, thus allowing the said trap-doors to open. Now when the beveled pinion 122 is in mesh with the pinion 77, through the medium of the gearing already described, the toothed quadrants 129 are moved in the direction indicated by arrow in Fig. 6, and result in the closing of the trap-doors; immediately these doors are closed the dog 72 locks the pinion 77.

139 is a pinion constantly in mesh with the pinion 77, and this pinion 139 is keyed to the shaft 140 journaled in suitable bearings 141 carried by the frame of the machine.

142 is a beveled pinion keyed to the shaft 140 and constantly in mesh with the beveled pinion 143 which is keyed to the shaft 144 corresponding to the shaft 78, and this shaft 144 operates the quadrant connected therewith after the manner hereinbefore described, for the purpose of closing the trap-door 82.

The follower comprises a truck 145 composed of the horizontal bar 146 which is secured to the plates 147 by the brackets 148. 149 are horizontal brace-rods also secured to the plates 147 and bracing the said truck.

150 and 151 are brace-rods connecting the standards 152 with the truck.

153 are back stays which connect the upper curved bars 154 and 155 together and brace them from the truck 145. The braces 151 together with the base of the truck 145 which comes in contact with the butt of the sheaf, are curved as shown in Figs. 1 and 13. The curved bars 154 and 155 are positioned above and in advance of the curved portion of the truck 145, as they are designed to contact with the sheaf near the top thereof. It will be understood that because of the described shape of the follower, it will contact with the butt of the sheaf as well as the top portion thereof and thereby enable the sheaf to be supported in the most advantageous manner: in other words, the follower is so shaped that the natural shape of the sheaf will not be interfered with. Carried by each standard 152 is a bracket 156 spaced apart from each end 157 of the curved bar 154, and journaled between these parts by means of a pin 158 passing therethrough is a wheel 159. The wheels 159 are designed to come in contact with the trap doors 81 and 82 when the parts are in the position illustrated in Fig. 5; the function of the wheels 159 is to facilitate movement of the follower and prevent as much as possible lateral movement thereof. Journaled in each plate 147 by their pins 160 are wheels 161, which operate upon the horizontal flange 162 of the rails 113 (which rails are secured to the bearings 58 and 59 by the braces 1162 and 163 and are further connected together and braced by the cross bar 164 suitably supported by the frame of the machine, as by supports 165) and 166 are wheels journaled by their pinions 167 also in the plates 147 and beneath the wheels 161: the wheels 166 operate against the under side of the flange 162. So mounting the follower enables the same to move with as little friction as possible.

When the follower 112 is in normal position, it is locked by the following means: 168 is a rod held in a pair of brackets 169 carried by the bearing 59. Keyed to the rod 168 is a disk 170.

171 is a curved rod loosely mounted on the rod 168 and connected by the link 172 held in its ear 173 with the bolt 174 operating through the brackets 175 secured in the disk 170 and depending therefrom.

176 is a coiled-spring mounted on the bolt 174 between said brackets, and 177 is a washer keyed to said bolt. In the outer end of the bolt 174 is journaled a roller 178 by its pin 179.

In order to make a compact machine, one of the standards 152 of the follower 112 is provided with an off-set portion 180, the vertical bar 181 of which normally rests against one end of the lip 182 secured to, or formed a part of, the base 183. This base 183 is loosely mounted on the rod 168, and the same is held from vertical movement by a collar 184, on said rod.

185 is a pocket formed in the vertical flange 186 of the base 183, and as the roller 178 is held in said pocket by the spring 176, the base 183 is consequently locked to the rod 168. It therefore follows that because of the engagement of the vertical bar 181 with the lip 182 the follower is locked in normal position.

The path of movement of the trap door 82 is indicated by arrow with tail in Figs. 8 and 9, and it will be noticed that the curved-rod 171 extends into the path of movement of said door which is indicated by the dotted line: so soon as the said door strikes said rod the bolt 174 is retracted and so moves the roller 178 out of the pocket 185 thus unlocking the base 183 and so permitting the free outward movement of the follower. As the follower 112 is moved outward, the bar 181 thereof will move the base 183 through the medium of the lip 182 until the pocket 185 is positioned to receive the roller 187 journaled by the pin 188 in the outer end of the bolt 189 which is connected by the link 190 with the ear 191 of the curved rod 192 loosely mounted on the rod 168.

When the roller 187 is in engagement with the pocket 185, the lip 182 is in engagement with the trap-door 82 (see dotted lines Fig. 8), and consequently this trap door is locked in open position. The bolt 189 is mounted in brackets 193 secured in the disk 170 and depending therefrom, and mounted on this bolt and between these brackets is a spring 194. 195 is a washer keyed to said bolt. When the bar 181 is in the position illustrated in Fig. 9, it rests against the rod 192. Now when the base 183 is moved as described, and the pocket 185 is moved opposite the roller 187 the spring 194 shoots this roller into the said pocket, and consequently locks the base 183 to the rod 168 and so locks the door 82 in open position. The movement of the roller 187 into the pocket 185 moves the rod 192 into the dotted position shown in Fig. 8. In due course the follower returns to normal position, and in so doing, its bar 181 comes in contact with the rod 192 thus unlocking the base 183 from the rod 168 and then the mechanism before described, namely, the racks 127 and quadrants 129, operate to close the trap-doors 81 and 82, and as the trap door 82 is returning to normal position it moves the base 183 through the medium of its lip 182 back to the normal position shown in Figs. 8 and 9, thus locking the follower in normal position through the medium of the roller 178 and the pocket 185. From the foregoing part of this specification it is clear that the follower and the trap door 82 alternately lock and release one another.

$m$ are collars on the rod 168 which space the rods 171 and 192 apart, and the rod 192 from the top of the base 183.

Each sprocket chain 111 passes through pulleys 196 journaled in the inner ends 197 of the levers 198 which are each pivoted by pins 199 to brackets 200 carried by the side members A. The upper ends of the levers 198 are connected by springs 201 to the brackets C. The curved portions 202 of the levers 198 are shaped to conform to an arc described from the pins 199, and these operate through a head 203 carried by each of the rails 113. By the spring-controlled construction just described it will be understood that the sprocket wheels 110 can be permitted to rotate a certain distance before the follower is unlocked, as before described, and consequently when the follower is unlocked it will be released very suddenly, and its sudden movement will insure it coming into contact with the shock almost immediately the same falls.

The front corner plates 204 of the shock-chamber are stationary.

205 are the side plates of the shock-chamber, and same are journaled by their pintles 206 in the eye studs 207 carried by the side 208 are side stays carried by the side members A and against which the side plates 205 are spring held.

Secured to the trap doors 81 and 82 are curved arms 209 which occupy the normal position illustrated in Figs. 2 and 3. When the said trap doors are moved into the position illustrated in Fig. 5, the said arms 201 ultimately move the side plates 205 into the position illustrated in full lines in Fig. 5, and the movement of these plates is had in order to facilitate the delivery of the shock.

210 are coiled springs connected at their upper ends to eyelets 211 carried by the side plates 205 and connected at their lower ends to plates 212 carried by the side stays 208. When the said side plates 205 occupy the position illustrated in Fig. 5, the springs 210 are under increased tension (see dotted lines in Fig. 3) so that as the trap doors 81 and 82 are returning to normal position, the said side plates 205 will be returned to normal position, in which position they are held against the said stays 208. For the purpose of clearness, the said springs 210 are omitted in Fig. 5.

2212 are curved levers carried by the doors 81 and 82, and journaled on each of the said levers is a connecting rod 213.

At each side of the shock-chamber, and secured to the side members A, are standards 214 in the upper ends of which are journaled the cranks 215 of the butt-rods 216 the normal position of which is shown clearly in Fig. 1. The connecting rods 213 are provided with slotted upper ends 217 through which extend the cranks 215, and these rods are positioned to operate between the standards 214. Simultaneous with the described movement of the side plates 205, the connecting rods 213, and their described connected parts, move the butt-rods 216 into the position shown in full lines in Fig. 5, or into such position that they will not interfere with the shock. The function of the butt-rods 216 is to prevent the butts of the sheaves in contact therewith from projecting over the end of the trap doors 81 and 82. As the side plates 205 are returning to normal position, the butt-rods 216 are also returning to this position.

218 are a plurality of cut-off bars carried by the plunger carriage 11. The function performed by these cut off bars is to prevent the entry of a sheaf into the sheaf-chamber 2 by closing the opening leading thereto by the platform 4, when the plunger 17 is shoving a sheaf into the shock-chamber. The speed of movement of the plunger 17 will be such that it will make one complete cycle for every sheaf delivered from the platform 4 into the sheaf chamber 2.

For each revolution of the shaft 67 the before-described movements take place.

219 are a plurality of hollow rollers mounted on the bolts 220 which extend respectively through the retaining bracket 221 and the base 222 of the standards 130. 223 are the nuts screwing on the ends of the said bolts. Intermediate the rollers 219 and the bolts 220 is a roller-ring 224 which is designed to prevent the rollers 219 from being bound in their bearings. The retaining bracket 221 is secured by nuts and bolts designated by the common numeral of reference 225 to the bottom plate D, and the base 222 is secured by the nuts and bolts indicated by the common numeral of reference 226 also to the said base. As shown in Fig. 7 particularly, the top flange 227 of the retaining bracket 221, and the shoulder 228 of the base 222 overlap a portion of the top of the racks 127 at each side thereof, and so provide means which co-act with the rollers 219 in order to provide suitable bearings for the said racks.

The free ends of the supporting arms 33, 34, 35 and 36 are curved inward as shown so that when the arms are in the dotted position indicated by short lines in Fig. 1, they will overlap and so completely embrace the shock.

The trap doors 81 and 82 are hinged to the inner ends of the side members A by means of the rods s passing through the ears t and u formed respectively with the side members A and said trap doors.

Fig. 17 is a vertical central section on the line o—p, Fig. 4, through the foot of one of the tubular shafts 29 showing how the cross bar 93 is mounted thereon. At the foot of each tubular shaft 29 is provided a collar l integrally provided with an internally threaded flange m—l which receives the externally threaded flange n of the collar o. These two flanges are keyed together by pins p. Mounted between the collars l and o of each tubular shaft are the heads q of the cross bar 93, and through these heads extend the flanges m—l which have bearing therein so as to permit the necessary movement of said tubular shafts.

229 is a plate mounted on a rod 230 having bearing at each end of the sides N of the sheaf-chamber. Portions of said plate are cut away at each side thereof as shown at 231 so that the coiled springs 232 may be mounted on said rod near each end thereof with their ends suitably secured so as to normally keep said plate against the bars 233 secured to the sides of the sheaf-chamber. The said spring-controlled plate 229 is positioned at the end of the sheaf-chamber where it opens into the shock-chamber, and each time the sheaf is moved into said shock-chamber, the said plate moves in the direction indicated by arrow in Fig. 23 thus allowing the free passage of the sheaf, and springing back into normal position under the influence of its springs 232 so soon as the sheaf has been moved into the said shock chamber. The function performed by this plate 229 is to prevent the butt of the last sheaf shoved into the shock-chamber from extending into the sheaf-chamber.

While I have described what I consider to be the best embodiment of my invention, I desire it to be understood that the principles can be embodied in different forms and I desire not to be limited beyond the requirements of the prior art and the terms of my claims.

The tubular shafts 29 pass through the supporting posts W, and have free movement therein.

What I claim as my invention is:

1. A machine of the class described comprising the combination of a frame; a shock-chamber carried by said frame provided with a pair of trap-doors mounted to open downward, and normally locked closed; a plurality of members operating above said shock chamber and yieldingly supported so as to support each sheaf as it is passed thereinto; means for supporting said members and raising and lowering the same at certain times; means operated to pass sheaves into said shock-chamber and between said supporting means, and a train of gearing put into operation by one of said members when the shock is formed in order to release said trap doors to allow the shock to drop on to the ground, said gearing ultimately closing said trap doors and locking them in position.

2. A machine of the class described comprising the combination of a frame; a shock-chamber carried by said frame provided with a pair of trap-doors mounted to open downward, and normally locked closed; a plurality of members operating above said shock-chamber and yieldingly supported so as to support each sheaf as it is passed thereinto; means for supporting said members and raising and lowering the same at certain times, means operated to pass sheaves into said shock-chamber and between said supporting means; a train of gearing put into operation by one of said members when the shock is formed in order to release said trap-doors to allow the shock to drop on to the ground, said gearing ultimately closing said doors and locking them in position; a follower mounted to operate underneath said shock-chamber so soon as said doors have been opened and the shock dumped, and means operated by said train of gearing to operate said follower and return it to normal position.

3. A machine of the class described comprising the combination of a frame; a shock-chamber carried by said frame provided with a pair of trap-doors mounted to open downward, and normally locked closed; a plurality of members operating above said shock-chamber and yieldingly supported so as to support each sheaf as it is passed thereinto; means for supporting said members and raising and lowering the same at certain times; means operated to pass sheaves into said shock-chamber and between said supporting means; a train of gearing put into operation by one of said members when the shock is formed in order to release said trap-doors to allow the shock to drop onto the ground, said gearing ultimately closing said doors and locking them in position; a follower mounted to operate underneath said shock-chamber so soon as said doors have been opened and the shock dumped; means in the path of movement of one of said trap-doors, locking said follower in normal position, and being operated by said door when the same opens fully, to unlock the said follower, and means operated by said train of gearing to operate said follower and return it to normal position.

4. A machine of the class described comprising the combination of a frame; a shock-chamber, carried by said frame, provided with a pair of trap-doors mounted to open downward, and normally locked closed; a plurality of supporting members operating above said shock-chamber so as to support each sheaf as it is passed thereinto; vertically disposed means for horizontally supporting said supporting members; means carried by the said vertically-disposed means whereby the said supporting-members move in unison horizontally, at certain times tension is exerted against said members, the strength of the same increasing as the shock grows in size; means whereby said supporting members are lowered as the shock is dropped and then returned to normal position; during the lowering movement of said supporting member, the tension of said spring-controlled means being reduced to the minimum; means operated to pass one sheaf at a time into said shock-chamber, and between said supporting members, and a train of gearing put into operation by one of said supporting members when the shock is formed in order to release said trap doors to allow the shock to drop on to the ground; the said gearing ultimately closing said doors and locking them in normal position.

5. A machine of the class described comprising the combination of a frame; a shock-chamber, carried by said frame, provided with a pair of trap-doors mounted to open downward, and normally locked closed; a plurality of supporting members operating above said shock-chamber so as to support each sheaf as it is passed thereinto; vertically disposed means for horizontally supporting said supporting members; means carried by the said vertically-disposed means whereby the said supporting-members move in unison horizontally, at certain times in opposite directions each around its support; a spring associated with said means and said supporting-members whereby tension is exerted against said members, the strength of the same increasing as the shock grows in size; means whereby said supporting members are lowered as the shock is dropped and then returned to normal position, during the lowering movement of said supporting members, the tension of said spring-controlled means being reduced to the minimum; means operated to pass one sheaf at a time into said shock-chamber, and between said supporting members; a train of gearing put into operation by one of said supporting members when the shock is formed in order to release said trap-doors to allow the shock to drop on to the ground, the said gearing ultimately closing said doors and locking them in normal position; a follower mounted to operate underneath said shock chamber so soon as said doors have been opened and the shock dumped, and means operated by said train of gearing to operate said follower and return it to normal position.

6. A machine of the class described comprising the combination of a frame; a shock chamber, carried by said frame, provided with a pair of trap-doors mounted to open downward and outward, and normally locked closed; a plurality of supporting members operating above said shock-chamber so as to support each sheaf as it is passed thereinto; vertically-disposed means for horizontally supporting said supporting members; means carried by the said vertically-disposed means whereby the said supporting-members move in unison horizontally, at certain times in opposite directions each around its support; a spring associated with said means and said supporting-members whereby tension is exerted against said members, the strength of the same increasing as the shock grows in size; means whereby said supporting members are lowered as the shock is dropped and then returned to normal position; during the lowering movement of said supporting members, the tension of said spring-controlled means being reduced to the minimum; a sheaf-chamber carried by said frame and communicating with said shock-chamber; a reciprocating-member operating in said sheaf-chamber to pass one sheaf at a time therefrom between said supporting-members and into said shock-chamber; means for operating said member, and a train of gearing put into operation by one of said supporting members when the shock is formed in order to release said trap-doors to allow the shock to drop on to the ground, the said gearing ultimately closing said doors and locking them in normal position.

7. A machine of the class described comprising the combination of a frame; a shock chamber, carried by said frame, provided with a pair of trap-doors mounted to open downward, and normally locked closed; a pair of vertical standards carried by said frame at one end of said shock chamber; a tubular shaft rotatably mounted on each of the said standards; means supported by said standards whereby when one of said tubular shafts is rotated, the other tubular shaft will be rotated in the opposite direction; a plurality of supporting arms fixed to, and carried in pairs by, the said tubular shafts and above said shock-chamber; spring-controlled means connected to one of said tubular shafts and controlling the horizontal movements of said arms, at certain times; means whereby said shafts and their supporting arms are lowered as the shock is dropped and then returned to normal position; means operated to pass sheaves into said shock chamber and between said supporting arms; a train of gearing put into operation by one of said supporting arms, when the shock is formed, in order to release said trap-doors to allow the shock to drop on to the ground; the said gearing ultimately closing said doors and locking them in normal position, and means operated by said train of gearing whereby as said tubular shafts and their supporting-arms are lowered, the tension of said spring-controlled means against said tubular shafts and their supporting arms will be reduced to a minimum.

8. A machine of the class described comprising the combination of a frame; a shock-chamber, carried by said frame, provided with a pair of trap-doors mounted to open downward, and normally locked closed; a pair of vertical standards carried by said frame at one end of said shock chamber; a tubular shaft rotatably mounted on each of the said standards; means supported by said standards whereby when one of said tubular shafts is rotated, the other tubular shaft will be rotated in the opposite direction; a plurality of supporting arms fixed to, and carried in pairs by, the said tubular shafts and above said shock chamber; spring-controlled means connected to one of said tubular shafts and controlling the horizontal movements of said arms, at certain times; means whereby said shafts and their supporting arms are lowered as the shock is dropped and then returned to normal position; means operated to pass sheaves into said shock chamber and between said supporting arms; a train of gearing put into operation by one of said supporting arms, when the shock is formed, in order to release said trap-doors to allow the shock to drop on the ground; the said gearing ultimately closing said doors and locking them in normal position; means operated by said train of gearing whereby as said tubular shafts and their supporting-arms are lowered, the tension of said spring-controlled means against said tubular shafts and their supporting arms will be reduced to a minimum, a follower mounted to operate underneath the said shock-chamber so soon as said doors have been opened and the shock dumped, and means operated by said train of gearing to operate said follower and return it to normal position.

9. A machine of the class described comprising the combination of a frame; a shock-chamber, carried by said frame, provided with a pair of trap-doors mounted to open downward, and normally locked closed; a pair of vertical standards carried by said frame at one end of said shock chamber; a tubular shaft rotatably mounted on each of the said standards; means supported by said standards whereby when one of said tubular shafts is rotated, the other tubular shaft will be rotated in the opposite direction; a plurality of supporting arms fixed to, and carried in pairs by, the said tubular shafts and above said shock chamber; spring-controlled means connected to one of said tubular shafts and controlling the horizontal movements of said arms, at certain times; means whereby said shafts and their supporting arms are lowered as the shock is dropped and then returned to normal position; means operated to pass sheaves into said shock chamber and between said supporting arms; a train of gearing put into operation by one of said supporting arms when the shock is formed, in order to release said trap-doors to allow the shock to drop on to the ground, the said gearing ultimately closing said doors and locking them in normal position; means operated by said train of gearing whereby as said tubular shafts and their supporting arms are lowered, the tension of said spring-controlled means against said tubular shafts and their supporting arms will be reduced to a minimum; a follower mounted to operate underneath the said shock-chamber so soon as said doors have been opened and the shock dumped; means, in the path of movement of one of said trap-doors, locking said follower in normal position and being operated by said door when the same opens fully, and unlocking the said follower, and means operated by said train of gearing to operate said follower and return it to normal position.

10. A machine of the class described comprising the combination of a frame; a shock-chamber, carried by said frame, provided with a pair of trap-doors mounted to open downward, and normally locked closed; a pair of vertical standards carried by said frame at one end of said shock-chamber; a tubular-shaft rotatably mounted on each of the said standards; means connecting said standards together at their upper ends; a toothed pinion keyed to each of the said tubular shafts; a train of gearing intermediate said pinions and in mesh therewith, whereby when one of the said tubular shafts is rotated the other tubular shaft will also be rotated but in the opposite direction; supporting means for said train of gearing; a plurality of supporting arms fixed to, and carried in pairs by, said tubular shafts and above said shock-chamber; spring-controlled means connected to one of the said tubular shafts and controlling the horizontal movements of said arms, at certain times; means whereby said shafts and their supporting arms are lowered as the shock is dropped and then returned to normal position; means operated to pass sheaves into said shock-chamber and between said supporting arms; a train of gearing put into operation by one of said supporting arms, when the shock is formed, in order to release said trap-doors to allow the shock to drop on to the ground; the said gearing ultimately closing said doors and locking them in normal position, and means operated by said train of gearing whereby as said tubular shafts and their supporting arms are lowered, the tension of said spring-controlled means against said tubular shafts and their supporting arms will be reduced to a minimum.

11. A machine of the class described comprising the combination of a frame; a shock-chamber, carried by said frame, provided with a pair of trap-doors mounted to open downward, and normally locked closed; a pair of vertical standards carried by said frame at one end of said shock chamber; a tubular shaft rotatably mounted on each of said standards; a cross bar connecting the upper ends of said standards together and integrally provided with a bracket at one side of the machine and integrally provided with a post having a lower portion occupying a downward-outward-backward position in respect thereto, at the other side of the machine; a toothed pinion keyed to each of the said tubular shafts; a train of gearing intermediate said pinions and in mesh therewith thereby when one of the said tubular shafts is rotated, the other tubular shaft will also be rotated but in the opposite direction; supporting means for said train of gearing; a plurality of supporting arms fixed to, and carried in pairs by, said tubular shafts and above said shock-chamber; an arm keyed to one of the said tubular shafts and embracing said post; a crank mounted in said bracket; a coil spring connecting said crank with said arm, these parts controlling horizontal movements of said arms at certain times; means whereby said shafts and their supporting arms are lowered as the shock is dropped and then returned to normal position; means for locking said tubular shafts and their connected parts in normal position; means operated to pass sheaves into said shock-chamber and between said supporting arms; a train of gearing put into operation by one of said supporting arms, when the shock is formed, in order to release said trap-doors to allow the shock to drop onto the ground; the said gearing ultimately closing the said doors and locking them in normal position; a beveled pinion keyed to said crank and supported by said bracket; another beveled pinion journaled in said bracket and in mesh with the first-mentioned pinion; a shaft for said second-mentioned beveled pinion, the said beveled pinions and shaft being operated by said train of gearing so that as said tubular shafts and their supporting arms are lowered, said crank is moved so that the tension of the spring, coupling the same to said arm exerted against said tubular shafts and their supporting arms, will be reduced to a minimum, and the said supporting arms moved out of engagement with the shock through the co-action between said arm and the extension of said post.

12. A machine of the class described comprising the combination of a frame; a shock-chamber, carried by said frame, provided with a pair of trap-doors mounted to open downward, and normally locked closed; a pair of vertical standards carried by said frame at one end of said shock chamber; a tubular shaft rotatably mounted on each of said standards; a cross bar connecting the upper ends of said standards together and integrally provided with a bracket, at one side of the machine and integrally provided with a post having a lower portion occupying a downward-outward-backward position in respect thereto, at the other side of the machine; a toothed pinion keyed to each of the said tubular shafts; a train of gearing intermediate said pinions and in mesh therewith whereby when one of the said tubular shafts is rotated, the other tubular shaft, will also be rotated but in the opposite direction; supporting means for said train of gearing; a plurality of supporting arms fixed to, and carried in pairs by, said tubular shafts and above said shock-chamber; an arm keyed to one of the said tubular shafts and embracing said post; a crank mounted in said bracket; a coiled-spring connecting said crank with said arm, these parts controlling horizontal movements of said arms at certain times; means whereby said shafts and their supporting arms are lowered as the shock is dropped and then returned to normal position; means for locking said tubular shafts and their connected parts in normal position; means operated to pass sheaves into said shock-chamber and between said supporting arms; a train of gearing put into operation by one of said supporting arms, when the shock is formed, in order to release said trap-doors to allow the shock to drop on to the ground; the said gearing ultimately closing the said doors and locking them in normal position; a beveled pinion keyed to said crank and supported by said bracket; another beveled pinion journaled in said bracket and in mesh with the first-mentioned pinion; a shaft for said second-mentioned beveled pinion, the said beveled pinions and shaft being operated by said train of gearing so that as said tubular shafts and their supporting arms are lowered, said crank is moved so that the tension of the spring, coupling the same to said arm exerted against said tubular shafts and their supporting arms will be reduced to a minimum, and the said supporting arms moved out of engagement with the shock through the co-action between said arm and the extension of said post; a follower mounted to operate underneath said shock-chamber so soon as said doors have been opened and the shock dumped, and means operated by said train of gearing to operate said follower and return it to normal position.

13. A machine of the class described comprising the combination of a frame; a shock-chamber, carried by said frame, provided with a pair of trap-doors mounted to open downward, and normally locked closed; a pair of vertical standards carried by said frame at one end of said shock-chamber; a tubular shaft rotatably mounted on each of said standards; a cross bar connecting the upper ends of said standards together and integrally provided with a bracket, at one side of the machine, and integrally provided with a post having a lower portion occupying a downward-outward-backward position in respect thereto at the other side of the machine; a toothed pinion keyed to each of the said tubular shafts; a train of gearing intermediate said pinions and in mesh therewith whereby when one of the said tubular shafts is rotated, the other tubular shaft will also be rotated but in the opposite direction; supporting means for said train of gearing; a plurality of supporting arms fixed to, and carried in pairs by, said tubular shafts and above said shock-chamber; an arm keyed to one of the said tubular shafts and embracing said post; a crank mounted in said bracket; a coiled-spring connecting said crank with said arm, these parts controlling horizontal movements of said arms at certain times; means whereby said shafts and their supporting arms are lowered as the shock is dropped and then returned to normal position; means for locking said tubular shafts and their connected parts in normal position; means operated to pass sheaves into said shock-chamber and between said supporting arms; a train of gearing put into operation by one of said supporting arms, when the shock is formed, in order to release said trap-doors to allow the shock to drop on the ground; the said gearing ultimately closing the said doors and locking them in normal position; a beveled pinion keyed to said crank and supported by said bracket, another beveled pinion journaled in said bracket and in mesh with the first-mentioned pinion; a shaft for said second-mentioned beveled pinion, the said beveled pinions and shaft being operated by said train of gearing so that as said tubular shafts and their supporting arms are lowered, said crank is moved so that the tension of the spring coupling the same to said arm exerted against said tubular shafts and their supporting arms, will be reduced to a minimum, and the said supporting arms moved out of engagement with the shock through the co-action between said arm and the extension of said post; a follower mounted to operate underneath said shock-chamber so soon as said doors have been opened and the shock dumped; means in the path of movement of one of said trap doors locking said follower in normal position, and being operated by said door when the same opens fully, to unlock the said follower, and means operated by said train of gearing to operate said follower and return it to normal position.

14. A machine of the class described comprising the combination of a frame; a shock-chamber, carried by said frame, provided with a pair of trap-doors mounted to open downward, normally locked closed; a pair of vertical standards carried by said frame at one end of said shock-chamber; a tubular shaft rotatably mounted on each of the said standards; means supported by said standards whereby when one of the said tubular shafts is rotated, the other tubular shaft will be rotated, in the opposite direction; a plurality of supporting arms fixed to, and carried in upper and lower pairs, by, the said tubular shafts, and above said shock-chamber, a spring-controlled auxiliary arm associated with each of the supporting arms composing the lower pair, and designed to perform the function of preventing a sheaf from escaping out of the shock-chamber when passed thereinto; spring-controlled means connected to one of said tubular shafts and controlling the horizontal movements of said arms, at certain times; means whereby said shafts and their supporting arms are lowered as the shock is dropped and then returned to normal position; means operated to pass sheaves into said shock chamber and between said supporting arms; a train of gearing put into operation by one of said supporting arms, when the shock is formed, in order to release said trap-doors to allow the shock to drop on to the ground; the said gearing ultimately closing said doors and locking them in normal position, and means operated by said train of gearing whereby as said tubular shafts and their supporting arms are lowered, the tension of said spring-controlled means against said tubular shafts and their supporting arms will be reduced to a minimum.

15. A machine of the class described comprising the combination of a frame; a pair of trapdoors mounted to open downward, and normally locked closed; a pair of spring-controlled side plates mounted in said frame to form the sides of a shock-chamber; a plurality of supporting members operating above said shock-chamber and yieldingly supported so as to support each sheaf as it is passed thereinto; means for supporting said members and raising and lowering the same at certain times; means operated to pass sheaves into said shock-chamber and between said supporting means; a train of gearing put into operation by one of said supporting members when the shock is formed in order to release said trap doors to allow the shock to drop on to the ground, said gearing ultimately closing said trap doors and locking them in position, and means whereby when said trap doors are unlocked said side plates will be swung inward.

16. A machine of the class described comprising the combination of a frame; a pair of trap doors mounted to open downward, and normally closed; a pair of spring-controlled side plates mounted in said frame to form the sides of a shock-chamber; a plurality of supporting members operating above said shock-chamber and yieldingly supported so as to support each sheaf as it is passed thereinto; means for supporting said members and raising and lowering the same at certain times; means operated to pass sheaves into said shock chamber and between said supporting means, a train of gearing put into operation by one of said supporting members when the shock is formed in order to release said trap doors to allow the shock to drop onto the ground, said gearing ultimately closing said trap doors and locking them in position; means whereby when said trap doors are unlocked said side plates will be swung inward; a pair of butt rods positioned to operate above the rear ends of said trap doors; means in which said butt rods are mounted, and means supported by each of the said trap doors and connected to said butt-rods whereby when said trap doors are released the said butt-rods will be moved in their bearings downward, as and for the purpose specified.

17. A machine of the class described comprising the combination of a frame; a pair of trap doors mounted to open downward, and normally locked closed; a pair of spring-controlled side plates mounted in said frame to form the sides of a shock-chamber; a plurality of supporting members operating above said shock chamber and yieldingly supported so as to support each sheaf as it is passed thereinto; means for supporting said members and raising and lowering the same at certain times; means operated to pass sheaves into said shock chamber and between said supporting means; a train of gearing put into operation by one of said supporting members when the shock is formed in order to release said trap doors to allow the shock to drop on to the ground, said gearing ultimately closing the said trap doors and locking them in position; means whereby when said trap doors are unlocked said side plates will be swung inward; a pair of butt rods positioned to operate above the rear ends of said trap doors; means in which the said butt rods are mounted; means supported by each of the said trap doors and connected to said butt-rods whereby when said trap doors are released the said butt-rods will be moved in their bearings downward; a follower mounted to operate underneath said shock chamber so soon as said doors have been opened and the shock dumped, and means operated by said train of gearing to operate said follower and return it to normal position.

18. A machine of the class described comprising the combination of a frame; a pair of trap doors mounted to open downward, and normally locked closed; a pair of spring-controlled side plates mounted in said frame to form the sides of a shock chamber; a plurality of supporting members operating above said shock chamber and yieldingly supported so as to support each sheaf as it is passed thereinto; means for supporting said members and raising and lowering the same at certain times; means operated to pass sheaves into said shock chamber and between said supporting means; a train of gearing put into operation by one of said supporting members when the shock is formed in order to release said trap doors to allow the shock to drop on to the ground, said gearing ultimately closing said trap doors and locking them in position; means whereby when said trap doors are unlocked said side plates will be swung inward; a pair of butt rods positioned to operate above the rear ends of said trap doors; means in which the said butt rods are mounted; means supported by each of the said trap doors and connected to said butt-rods whereby when said trap doors are released the said butt-rods will be moved in their bearings downward; a follower mounted to operate underneath said shock chamber so soon as said doors have been opened and the shock dumped; means in the path of movement of one of said trap doors, locking said follower in normal position, and being operated by said door when the same opens fully to unlock said follower, and means operated by said train of gearing to operate said follower and return it to normal position.

19. A machine of the class described comprising the combination of a frame; a pair of trap doors mounted to open downward, and normally locked closed; a pair of spring-controlled side plates mounted in said frame to form the sides of a shock chamber; a plurality of horizontally-disposed supporting members operating above said shock chamber; vertically-disposed means for supporting said supporting members; means for raising and lowering the said supporting-members at certain times; means carried by the said vertically-disposed means whereby the said supporting members move, in unison horizontally at certain times, in opposite directions each around its support; a spring associated with said means and said supporting-members whereby tension is exerted against said members, the strength of the same increasing as the shock grows in size; means operated to pass sheaves into said shock-chamber and between said supporting means; a train of gearing put into operation by one of said supporting members when the shock is formed in order to release said trap doors to allow the shock to drop on to the ground, said gearing ultimately closing said trap doors and locking them in position, and means whereby when said trap doors are unlocked, said side plates will be swung inward.

20. A machine of the class described comprising the combination of a frame; a pair of trap doors mounted to open downward, and normally locked closed; a pair of spring-controlled side plates mounted in said frame to form the sides of a shock-chamber; a plurality of supporting members operating above said shock-chamber and yieldingly supported so as to support each sheaf as it is passed thereinto; means for supporting said members and raising and lowering the same at certain times; a drive wheel journaled in the forward part of said frame; a reciprocating member; a crank mechanism operated by said wheel and connected with said reciprocating member to operate said member to pass sheaves into said shock-chamber, and a train of gearing put into operation by one of said supporting members when the shock is formed in order to release said trap doors to allow the shock to drop on to the ground, said gearing ultimately closing said trap doors and locking them in position.

21. A machine of the class described comprising the combination of a frame; a pair of trap doors mounted to open downward, and normally locked closed; a pair of spring-controlled side plates mounted in said frame to form the sides of a shock chamber; a plurality of supporting members operating above said shock-chamber and yieldingly supported so as to support each sheaf as it is passed thereinto; means for supporting said members and raising and lowering the same at certain times; a drive-wheel journaled in the forward part of said frame; a pair of rails carried by said frame; a carriage provided with wheels mounted to operate on said rails; a plunger supported by said carriage; crank mechanism operated by said wheel and connected with said carriage whereby the same is reciprocated back and forth as the wheel rotates in order to pass sheaves into said shock-chamber, and between said supporting means, and a train of gearing put into operation by one of said supporting members when the shock is formed in order to release said trap doors to allow the shock to drop on to the ground, said gearing ultimately closing said trap doors and locking them in position.

22. A machine of the class described comprising the combination of a frame; a pair of trap-doors mounted to open downward and normally locked closed; a pair of spring-controlled side plates mounted in said frame to form the sides of a shock-chamber; a plurality of supporting members operating above said shock chamber and yieldingly supported so as to support each sheaf as it is passed thereinto; means for supporting said members and raising and lowering the same at certain times; means operated to pass sheaves into said shock-chamber and between said supporting means; a quadrant positioned at each side of the said frame; bearings for said quadrants; a toothed-rack co-acting with each of the said quadrants and supported underneath the same; means whereby the said trap doors are each linked to its associated one of the said racks, and a train of gearing connected with the said quadrants and put into operation by one of the said supporting members when the shock is formed in order to release said trap doors to allow the shock to drop on to the ground, said gearing ultimately operating said quadrants and their connected parts in order to close said trap doors and lock them in position.

23. A machine of the class described comprising the combination of a frame; a pair of trap doors mounted to open downward, and normally locked closed; a pair of spring-controlled side plates mounted in said frame to form the sides of a shock chamber; a pair of vertical standards carried by said frame at one end of said shock-chamber; a tubular-shaft rotatably mounted on each of the said standards; means supported by said standards whereby when one of the said tubular shafts is rotated, the other tubular shafts will be rotated in the opposite direction; a plurality of supporting arms fixed to, and carried in pairs by, the said tubular shafts and above said shock-chamber; spring-controlled means connected to one of said tubular shafts and controlling the horizontal movements of said arms at certain times; means whereby said shafts and their supporting arms are lowered as the shock is dropped and then returned to normal position; means operated to pass sheaves into said shock-chamber; means whereby said tubular shafts and their means whereby said tubular shafts and their supported parts and the said trap doors are locked in elevated position until the shock is fully formed; a train of gearing put into operation by one of said supporting arms when the shock is formed, in order to release said trap doors to allow the shock to drop on to the ground, and to lower and raise said supporting arms, the said gearing ultimately closing said doors; means whereby when said trap doors are unlocked said side plates will be swung inward; means operated by said train of gearing whereby as said tubular shafts and their supporting arms are lowered, the tension of said spring-controlled means against said tubular shafts and their supporting arms will be reduced to a minimum; a tender mounted to operate underneath said shock chamber so soon as said doors have been opened and the shock dumped; means, in the path of movement of one of said trap doors locking said tender in normal position, and being operated by said door when the same opens fully and unlocking said tender, and means operated by said train of gearing to operate said tender and return it to normal position.

24. A machine of the class described comprising the combination of a frame; a pair of trap doors mounted to open downward and normally locked closed; a pair of spring-controlled side plates mounted in said frame to form the sides of a shock chamber; a pair of vertical standards carried by said frame at one end of said shock-chamber; a tubular-shaft rotatably mounted on each of the said standards; means supported by said standards whereby when one of the said tubular shafts is rotated, the other tubular shaft will be rotated in the opposite direction; a plurality of supporting arms fixed to, and carried in pairs by, the said tubular shafts and above said shock-chamber;

spring-controlled means connected to one of said tubular shafts and controlling the horizontal movements of said arms at certain times; means whereby said shafts and their supporting arms are lowered as the shock is dropped and then returned to normal position; means operated to pass sheaves into said shock-chamber and between said supporting arms; means whereby said tubular shafts and their supported parts and the said trap doors are locked in elevated position until the shock is fully formed; a train of gearing put into operation by one of said supporting arms, when the shock is formed, in order to release said trap doors to allow the shock to drop on to the ground, and lower and raise the said supporting arms, the said gearing ultimately closing said doors; means whereby when said trap doors are unlocked said side plates will be swung inward; means operated by said train of gearing whereby as said tubular shafts and their supporting arms are lowered, the tension of said spring-controlled means against said tubular shafts and their supporting arms will be reduced to a minimum; a pair of butt rods positioned to operate above the rear ends of said trap doors; means in which the said butt rods are mounted; means supported by each of the said trap doors and connected to said butt-rods whereby when said trap doors are released the said butt-rods will be moved in their bearings downward; a tender mounted to operate underneath said shock-chamber so soon as said doors have been opened and the shock dumped; means, in the path of movement of one of said trap doors, locking said tender in normal position and being operated by said door when the same opens fully and unlocking the said tender, and means operated by said train of gearing to operate said tender and return it to normal position.

25. In a machine of the class described, the combination of a frame; a shock-chamber, carried by said frame, provided with a pair of trap-doors mounted to open downward and outward; a pair of rails supported underneath said frame; a tender operating on said rails in a position in advance of the front end of said shock-chamber; means carried by said frame and normally locking said tender in normal position; a train of gearing; means for operating said gearing, and means intermediate said train of gearing and said trap-doors operated at certain times to release said trap doors, the whole being arranged as set forth and for the purpose specified.

26. In a machine of the class described, the combination of a frame; a shock-chamber, carried by said frame, provided with a pair of trap doors mounted to open downward and outward; a pair of rails supported underneath said frame; a tender mounted on wheels, operating on said rails in a position in advance of the front end of said shock-chamber; means carried by said frame and normally locking said tender in normal position; a shaft held in bearings carried by said frame; sprocket-wheels keyed to said shaft, one associated with each end of the said tender; a spring-controlled pulley positioned at the outer ends of each of the said rails; a sprocket-chain passing over each of the said pulleys and connected with the said tender and its associated sprocket wheel at each end of the said tender; a train of gearing; means for operating said gearing and said sprocket-chain pulleys, and means intermediate said train of gearing and said trap doors, operated, at certain times, to release said trap doors, the whole being arranged as set forth and for the purpose specified.

27. In a machine of the class described, the combination of a frame; a pair of vertical standards carried by said frame at one end thereof; a tubular shaft rotatably mounted on each of the said standards; means supported by said standards whereby when one of said tubular shafts is rotated, the other tubular shaft will be rotated in the opposite direction; a plurality of supporting arms fixed to, and carried by, the said tubular shafts and extending back over said frame; spring-controlled means connected to one of said tubular shafts and controlling the horizontal movements of said arms, at certain times; a shaft having bearing in said standards below said tubular shafts, and provided with a crank intermediate said standards; a cross bar carried at each end by the said tubular shafts; rods connecting said cross bar with said crank, and means whereby said shaft is operated, at certain times, in order to lower and raise said tubular shafts, and their supporting arms.

28. In a machine of the class described, the combination of a frame; a pair of vertical standards carried by said frame at one end thereof; a tubular shaft rotatably mounted on each of the said standards; means supported by said standards whereby when one of said tubular shafts is rotated, the other tubular shaft will be rotated in the opposite direction; a plurality of supporting arms fixed to, and carried by, the said tubular shafts and extending back over said frame; spring-controlled means connected to one of said tubular shafts and controlling the horizontal movements of said arms, at certain times; a shaft having bearing in said standards below said tubular shafts and provided with a crank intermediate said standards; a cross bar carried at each end by the said tubular shafts; rods connecting said cross bar with said crank;

means whereby said shaft is operated at certain times in order to lower and raise said tubular shafts and their supporting arms, and means carried by said standards whereby said tubular shafts and their supported parts are locked from vertical movement at certain times.

29. In a machine of the class described, the combination of a frame; a pair of vertical standards carried by said frame at one end thereof; a tubular shaft rotatably mounted on each of the said standards; means supported by said standards whereby when one of the said tubular shafts is rotated, the other tubular shaft will be rotated in the opposite direction; a cross bar connecting the upper ends of said standards together and provided at one end with a bracket, and further provided at the other end with a vertically-disposed post having a lower portion occupying a downward-outward-backward position in respect thereto; an arm keyed to one of said tubular shafts and embracing said post; a crank mounted in said bracket; a coiled-spring connecting said crank with said arm; a plurality of supporting arms fixed to, and carried by, said tubular shafts and extending back over said frame; a shaft having bearing in said standards below said tubular shafts and normally provided with a crank intermediate said standards; a cross bar carried at each end by the said tubular shafts; rods connecting said cross bar with said crank; a beveled pinion keyed to said crank mounted in said bracket and supported by said bracket; means intermediate said crank provided shaft and said beveled pinion thereon whereby when said crank provided shaft is operated, said tubular shafts and their supporting arms are lowered, and said crank mounted in said bracket, moved so that the tension of the spring against said supporting arms will be reduced to a minimum, and the said supporting arms moved to the limit of their out-movement through the co-action of said arm and the extension of said post, and means for operating said shaft at certain times.

30. In a machine of the class described, the combination of a frame; a pair of vertical standards carried by said frame at one end thereof; a tubular shaft rotatably mounted on each of the said standards; means supported by said standards whereby when one of said tubular shafts is rotated, the other tubular shaft will be rotated in the opposite direction; a plurality of horizontally-disposed supporting arms fixed to, and carried by, said tubular shafts and extending back over said frame; a spring associated with said means and said supporting arms and said tubular shafts whereby tension is exerted against said arms, the strength of the same increasing at certain times; means carried by said standards for locking said tubular shafts and their supported parts in elevated position at certain times; means operated at certain times to lower and elevate said tubular shafts and their connected parts; a member operated to pass a sheaf at a time between said supporting arms, and means for reciprocating said member.

31. In a machine of the class described, the combination of a frame; a pair of vertical standards carried by said frame, at one end thereof; a tubular shaft rotatably mounted on each of the said standards; means supported by said standards whereby when one of said tubular shafts is rotated, the other tubular shaft will be rotated in the opposite direction; a plurality of horizontally-disposed supporting arms fixed to, and carried by, said tubular shafts and extending back over said frame; a spring associated with said means and said supporting arms and said tubular shafts whereby tension is exerted against said arms, the strength of the same increasing at certain times; means carried by said standards for locking said tubular shafts and their supported parts in elevated position at certain times; means operated at certain times to lower and elevate said tubular shafts and their connected parts; a spring-controlled auxiliary arm associated with the lower pair of said supporting arms designed to perform the function of a stop to prevent sheaves from escaping from said arms when passed therebetween; a member operated to pass a sheaf at a time between said supporting arms, and means for reciprocating said member.

32. In a machine of the class described, the combination of a frame; a pair of vertical standards carried by said frame at one end thereof; a tubular shaft rotatably mounted on each of the said standards; means supported by said standards whereby when one of said tubular shafts is rotated, the other tubular shaft will be rotated in the opposite direction; a plurality of horizontally-disposed supporting arms fixed to, and carried by, said tubular shafts and extending back over said frame; a spring associated with said means and said supporting arms and said tubular shafts whereby tension is exerted against said arms, the strength of the same increasing at certain times; means carried by said standards for locking said tubular shafts and their supported parts in elevated position at certain times; means operated at certain times to lower and elevate said tubular shafts and their connected parts; a carriage reciprocated back and forth; means carried by said frame supporting said carriage; a vertically-disposed member pivoted to the inner end of said carriage; a spring connecting said member to said carriage and keeping the said member normally in a vertical position, and means for reciprocating said carriage and said member to pass a sheaf at a time between the before-mentioned arms.

33. In a machine of the class described, the combination of a frame; a pair of trap-doors mounted in said frame to open downward, and normally locked closed; means hinged to each of the said trap doors and supported by said frame at each side of the machine; a train of gearing immediately associated with said means; a driven-shaft journaled in said frame; a train of gearing intermediate said first-mentioned train of gearing and said driven shaft; means whereby said first-mentioned train of gearing, and its connected parts, are locked, at certain times, to lock said trap doors in closed position, and means whereby said second-mentioned train of gearing receives movement from said driven-shaft at certain times, to release the locking means for the first-mentioned train of gearing to suddenly release said doors.

34. In a machine of the class described, the combination of a frame; a pair of trap doors hinged in said frame and mounted to open downward and outward; means locking and controlling the movements of said trap doors and releasing them at certain times; a pair of side plates, one mounted at each side of said frame and designed to be moved inward as said trap doors are opened; side stays carried by said frame at each side; coiled-springs connecting said side plates with said stays in order to normally hold said side plates against said stays, and means whereby when the said trap doors are opened, the said side plates are moved inward against the tension of the springs and returned to normal position by said springs as said trap doors are closing.

35. In a machine of the class described, the combination of a frame; a pair of trap doors hinged in said frame and mounted to open downward; means locking and controlling the movements of said trap doors, at certain times; a pair of side plates, one mounted at each side of said frame and designed to be moved inward as said trap doors are opened; means whereby when the said trap doors are opened and closed, the said side plates will be moved inward and returned to normal position; a pair of butt rods positioned above the outer ends of said trap doors; means carried by said frame in which the inner ends of said butt-rods are journaled, and means whereby when said trap doors are opened, said butt-rods will be tilted downwardly in their bearings.

36. In a machine of the class described, the combination of a frame; a pair of trap doors hinged in said frame and mounted to open downward and outward; means locking and controlling the movements of said trap doors and releasing them at certain times; a pair of side plates, one mounted at each side of said frame and designed to be moved inward as said trap doors are opened; side stays carried by said frame at each side; coiled-springs connecting said side plates with said stays in order to normally hold said side plates against said stays; means whereby when the said trap doors are opened, the said side plates are moved inward against the tension of the springs and returned to normal position by said springs as said trap doors are closing; a pair of butt rods positioned above the outer ends of said trap doors; means carried by said frame in which the inner ends of said butt rods are journaled, and means whereby when said trap doors are opened, said butt rods will be tilted downwardly in their bearings.

37. In a machine of the class described, the combination of a frame; a pair of vertical standards carried by said frame at one end thereof; a tubular shaft rotatably mounted on each of the said standards; means supported by said standards whereby when one of said tubular shafts is rotated, the other tubular shaft will be rotated in the opposite direction; supporting arms positioned to co-act, each fixed to, and carried by, its associated one of the said tubular shafts and above said frame; a curved auxiliary arm for each supporting arm, provided with a slot for the major portion of its length, pivoted to each of the said supporting arms and through which its supporting arm passes; and a spring connecting each auxiliary arm with its supporting arm whereby said auxiliary arms are normally spring held against their associated supporting arms and normally occupy the position to prevent the escape of a sheaf after it has been passed therebetween and said supporting arms.

38. In a machine of the class described, the combination of a frame; a shock-chamber carried by said frame, provided with a pair of trap doors mounted to open downward, and normally locked closed; means for opening and closing said trap doors; a spring-controlled vertically-disposed plate journaled at the mouth of said shock-chamber and constructed to open backward over said chamber; a sheaf-chamber communicating with said shock-chamber, and means reciprocating in said sheaf-chamber for passing sheaves into said shock chamber, said spring-controlled plate returning to normal position after a sheaf has been passed thereover to prevent the butt thereof from extending into said sheaf-chamber.

39. In a machine of the class described, the combination of a frame; a pair of trap doors journaled in said frame and mounted to open apart downward and outward;

means for opening and closing said trap doors; means whereby the said trap doors are operated in unison and locked in closed position; a tender mounted to operate underneath said frame and between said trap doors, and normally positioned to escape the inner ends of said trap doors; means for supporting said tender so as to allow the same to operate underneath said frame and lengthwise thereof; locking mechanism supported by said frame and designed so as to lock said tender in normal position, one of said trap-doors, when opened fully, unlocking said locking mechanism to release said tender; means for operating said tender between said doors to the limit of its out-movement and then returning it to normal position; a bolt carried by said locking mechanism positioned by the said tender as it commences to move outward, to lock the said one of said trap doors thereby locking said trap doors against movement during the complete movement of said tender, the whole being arranged and operating as set forth and for the purpose specified.

40. In a machine of the class described, the combination of a frame; a pair of trap doors journaled in said frame and mounted to open apart downward and outward; means for opening and closing said trap doors; means whereby the said trap doors are operated in unison and locked in closed position; a tender mounted to operate underneath said frame and between said trap doors, and normally positioned to escape the inner ends of said trap doors; means for supporting said tender so as to allow the same to operate underneath said frame and lengthwise thereof; locking mechanism comprising a rod supported by said frame; a disk keyed to said rod; a base loosely mounted on said rod; a pair of spring-controlled rods loosely mounted on said rod and having their ends spaced apart; means whereby said rods alternately operate to lock said base to said disk; the said base being in contact with said tender and being locked to said rod when said tender is in normal position; one of said trap doors, when fully opened, operating one of said spring-controlled rods to unlock said base and so release said tender; means for operating said tender between said doors to the limit of its out-movement and then returning it to normal position; the said tender, as it commences to move outward, moving said base against said one of said trap doors to lock the said trap doors against movement during the complete movement of said tender, through the medium of one of said spring-controlled rods, and then as it is returned to normal position, said tender contacting with one of said spring-controlled rods to unlock said base from said rod, when the said one of said trap doors, when returning to normal position, operates said base so as to move the same in contact with said tender and lock it in normal position through the medium of one of said spring-controlled rods co-acting with said rod of said base.

41. A tender comprising a truck the front portion of which is curved inward; a plate secured to each side of said truck; a plurality of wheels journaled in each of the said plates; a pair of inwardly-curved bars positioned above said truck and in advance thereof, and means for supporting said curved bars from said curved truck.

42. A tender comprising a truck, the front portion of which is curved inward; a plate secured to each side of said truck; a plurality of wheels journaled in each of the said plates; a pair of inwardly-curved bars positioned above said truck and in advance thereof, and one higher than the other; a pair of end standards connecting said curved bars with said truck the ends of the upper curved bar extending beyond said standards to form the upper member of a bearing at each side of the said truck; a bracket carried by each of the said standards and below the outer ends of said upper curved bar forming the lower member of said bearings; a wheel horizontally journaled between the said members of said brackets, and a pair of back-stays for bracing said curved bars from said truck.

43. In a machine of the class described, the combination of a frame; a shock-chamber carried thereby; a sheaf-chamber also carried by said frame and communicating with said shock-chamber; an axle journaled in said frame; a wheel keyed to said axle; standards on said axle, one at each end thereof; a crank journaled in the upper ends of said standards and provided at each end with a crank arm each positioned at corresponding but opposite angles, to said crank, and operating without said standards; a pair of crank arms, one keyed to each end of said axle positioned each parallel to its associated companion of the said other crank arms and beyond said standards, a link rod connecting each pair of crank arms together at each side of said wheel; a carriage mounted to operate within said sheaf-chamber and provided at each side with a plurality of wheels; a rail carried by said frame and at each side of said sheaf-chamber and with which said wheels co-act; an arm secured to said carriage; a plunger pivoted to the outer end of said arm; a spring connecting said plunger with said arm, and a connecting rod connecting said crank with said carriage so that as said wheel rotates said carriage and its plunger will be moved back and forth.

44. In a machine of the class described, the combination of a frame; a pair of vertical standards supported at one end thereof; a cross-bar connecting the upper ends of said standards together, and provided at one end with a vertically-disposed depending post having a downward-outward-backward extending lower portion; a tubular shaft rotatably mounted on each of the said standards; means carried by said cross bar and co-acting with means carried by one of said tubular shafts to hold said shafts in elevated position at certain times; means connecting said tubular shafts together; means whereby when one of said tubular shafts moves, around its axis, the other of said tubular shafts will also move around its axis but in the direction of movement opposite that of the first-mentioned tubular shaft; an arm fixed to, and carried by, its associated one of said tubular shafts and embracing said post; means for rotating said tubular shafts at certain times to unlock the same from said cross bar to allow them to drop downward; when said arm co-acts with the lower portion of said post to further rotate said tubular shafts, as set forth and for the purpose specified.

45. A machine of the class described comprising the combination of a frame; means hinged thereto to temporarily support a plurality of sheaves during the building of a shock; a plurality of members operating above said supporting means; means carried by said frame to yieldingly hold said members so that the same will support each sheaf as it is passed therebetween; means for raising and lowering said members at certain times; means operated to pass sheaves between said members, and a train of gearing put into operation by one of said members when the shock is completed in order to release said supporting means therefrom to allow the shock to drop on to the ground.

46. In a machine of the class described, the combination of the frame; a trap door hinged to said frame to open downward and outward; a truck carried by said frame; a pair of rails supported underneath said frame upon which said truck operates; means whereby said truck is operated; a locking mechanism comprising a supporting-member carried by said frame; another member keyed to said supporting-member; a base loosely mounted on said supporting-member against which the said truck normally rests; a pair of rods loosely mounted on said supporting-member and between the said base and said other member, and having their outer ends spaced apart; spring-controlled means carried by said other member and designed to alternately lock said base to said supporting-member, each of the said rods being loosely coupled to its associated one of said spring-controlled means; one of said rods being positioned so that its associated spring-controlled means locks said base to said supporting-member; said rod being in the path of opening movement of said door so that when said door is unlocked and opened, it will contact with said rod and move it and its spring-controlled means to unlock said base from said supporting-member to permit the truck to be run out and returned to normal position, the truck on its initial outward movement moving said base on said supporting-member out of its path of movement; the said truck, during its return to normal position, contacting with the other rod thus moving its spring-controlled means so as to unlock said base from said supporting-member; means for closing and locking closed said door, after said truck has been returned to normal position, the said door, during its closing movement, moving said base ultimately causing one of said spring-controlled means to lock it to said supporting-member and so lock said truck in place.

47. In a machine of the class described, the combination of the frame; a trap door hinged to said frame to open downward and outward; a truck carried by said frame; a pair of rails supported underneath said frame upon which said truck operates; means whereby said truck is operated; a locking mechanism comprising a supporting-member carried by said frame; another member keyed to said supporting-member; a base loosely mounted on said supporting-member against which the said truck normally rests; a vertical flange carried by said base; a pair of rods loosely mounted on said supporting-member and between the said base and said other member, and having their outer ends spaced apart; spring-controlled means carried by said other member and designed to coact with said vertical flange to ultimately lock said base to said supporting-member, each of the said rods being loosely coupled to its associated one of said spring-controlled means; one of said rods being positioned so that its associated spring-controlled means co-acts with said flange and locks said base to said supporting-member; said rod being in the path of opening movement of said door so that when said door is unlocked and opened, it will contact with said rod and move it and its spring-controlled means to unlock said base from said supporting-member to permit the truck to be run out and returned to normal position, the truck on its initial outward movement moving said base on said supporting-member out of its path of movement; the said truck, during its return to normal position, contacting with the other rod thus moving its spring-controlled means so as to unlock said base from said supporting-member; means for closing and locking closed said door, after said truck has been returned to normal position, the said door, during its closing movement, moving said base ultimately causing one of said spring-controlled means to lock it to said supporting-member and so lock said truck in place.

48. In a machine of the class described, the combination of the frame; a trap door hinged to said frame to open downward and outward; a truck carried by said frame; a pair of rails supported underneath said frame upon which said truck operates; means whereby said truck is operated; a locking mechanism comprising a supporting-member carried by said frame; another member keyed to said supporting-member; a base loosely mounted on said supporting-member against which the said truck normally rests; a vertical flange carried by said base; a pair of rods loosely mounted on said supporting-member one above the other and having their outer ends spaced apart; a spring-controlled bolt loosely connected with each of the said rods; brackets carried by said other member in which the said bolts are mounted; a roller mounted in the outer ends of each of the said bolts; one of said rods being so positioned that its associated bolt co-acts with said flange and locks said base to said supporting-member, said rod being in the path of opening movement of said door so that when said door is unlocked and opened, it will contact with said rod and move it and its spring-controlled bolt to unlock said base from said supporting-member to permit the truck to be run out and returned to normal position, the truck and its initial outward movement moving said base on said supporting-member out of its path of movement, the said truck, during its return to normal position, contacting with the other rod thus moving its spring-controlled bolt so as to unlock said base from said supporting-member; means for closing and locking closed said door, after said truck has been returned to normal position, the said door during its closing movement, moving said base ultimately causing one of said spring-controlled bolts to lock it to said supporting-member and so lock said truck in place.

In testimony whereof I have affixed my signature in presence of two witnesses.

GUY DESMOND GRIFFITHS.

Witnesses:
 JOHN KERSHAW,
 HAROLD BISHOP.